(12) United States Patent
Morozumi et al.

(10) Patent No.: US 10,603,942 B2
(45) Date of Patent: *Mar. 31, 2020

(54) TRANSFER FILM, METHOD FOR MANUFACTURING FILM SENSOR, FILM SENSOR, FRONT PLATE-INTEGRATED SENSOR, AND IMAGE DISPLAY DEVICE

(71) Applicant: FUJIFILM Corporation, Tokyo (JP)

(72) Inventors: Kazumasa Morozumi, Shizuoka (JP); Shuichiro Osada, Shizuoka (JP); Takashi Aridomi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.
This patent is subject to a terminal disclaimer.

(21) Appl. No.: 15/945,784

(22) Filed: Apr. 5, 2018

(65) Prior Publication Data

US 2018/0222236 A1   Aug. 9, 2018

Related U.S. Application Data

(63) Continuation of application No. PCT/JP2016/078317, filed on Sep. 26, 2016.

(30) Foreign Application Priority Data

Oct. 26, 2015  (JP) ................. 2015-210249
Jun. 3, 2016   (JP) ................. 2016-111468
Jul. 15, 2016  (JP) ................. 2016-140527

(51) Int. Cl.
*B41M 5/00* (2006.01)
*B41M 5/42* (2006.01)
(Continued)

(52) U.S. Cl.
CPC ............ *B41M 5/426* (2013.01); *B32B 27/00* (2013.01); *B41M 1/20* (2013.01); *B41M 5/00* (2013.01);
(Continued)

(58) Field of Classification Search
CPC . B41M 1/28; B41M 1/34; B41M 5/00; B41M 5/0058; B41M 5/007; B41M 2205/04; G06F 2203/04103
(Continued)

(56) References Cited

U.S. PATENT DOCUMENTS 10,174,181 B2 * 1/2019 Morozumi ............ C08K 3/04
2013/0153393 A1 6/2013 Omote et al.
(Continued)

FOREIGN PATENT DOCUMENTS

CN 102576190 A 7/2012
CN 103250121 A 8/2013
(Continued)

OTHER PUBLICATIONS

Machine translation of detailed description of JP2013-228695 acquired Aug. 23, 2019.*
(Continued)

*Primary Examiner* — Gerard Higgins
(74) *Attorney, Agent, or Firm* — Sughrue Mion, PLLC

(57) ABSTRACT

Provided are a transfer film for forming a decorative layer on at least one surface of a film sensor, the transfer film including a temporary support and a coloring composition layer, the coloring composition layer including a black pigment or a white pigment, in which a content a (% by mass) of the black pigment or the white pigment in the coloring composition layer and a film thickness b (μm) of the coloring composition layer satisfy Expression 1; and a transfer film including a temporary support and a coloring composition layer, the coloring composition layer including a black pigment or a white pigment, in which a content a (% by mass) of the black pigment or the white pigment in the coloring composition layer and a film thickness b (μm) of the coloring composition layer satisfy Expression 1, 80>a×b>10                                      Expression 1.

15 Claims, 7 Drawing Sheets

(51) Int. Cl.
*B32B 27/00* (2006.01)
*G06F 3/041* (2006.01)
*G09F 9/00* (2006.01)
*G06F 3/044* (2006.01)
*B41M 1/20* (2006.01)
*B41M 5/03* (2006.01)
*G02F 1/1335* (2006.01)

(52) U.S. Cl.
CPC ......... *B41M 5/03* (2013.01); *G02F 1/133512* (2013.01); *G06F 3/041* (2013.01); *G06F 3/044* (2013.01); *G06F 3/0412* (2013.01); *G06F 3/0416* (2013.01); *G09F 9/00* (2013.01); *G06F 2203/04103* (2013.01); *G06F 2203/04111* (2013.01)

(58) Field of Classification Search
USPC .......................................... 428/32.69, 32.73
See application file for complete search history.

(56) References Cited

U.S. PATENT DOCUMENTS

| | | |
|---|---|---|
| 2015/0015813 A1 | 1/2015 | Yoshinari et al. |
| 2015/0092123 A1 | 4/2015 | Gotoh et al. |
| 2015/0169113 A1 | 6/2015 | Ito et al. |

FOREIGN PATENT DOCUMENTS

| | | |
|---|---|---|
| CN | 104412207 A | 3/2015 |
| JP | 2010-237589 A | 10/2010 |
| JP | 2011-095716 A | 5/2011 |
| JP | 2012-133597 A | 7/2012 |
| JP | 2013-228695 A | 11/2013 |
| JP | 2015-168601 A | 9/2015 |
| WO | 2013/146372 A1 | 10/2013 |
| WO | 2013/191062 A1 | 12/2013 |

OTHER PUBLICATIONS

Machine translation of detailed description of JP2015-168601 acquired Aug. 23, 2019.*
Machine translation of detailed description of JP2010-237589 acquired Aug. 23, 2019.*
Machine translation of detailed description of JP2011-095716 acquired Aug. 23, 2019.*
International Preliminary Report on Patentability with Translation of Written Opinion dated May 1, 2018 in International Application No. PCT/JP2016/078317.
International Search Report in Application No. PCT/JP2016/078317 dated Nov. 1, 2016.
Written Opinion in Application No. PCT/JP2016/078317 dated Nov. 1, 2016.
Communication dated Apr. 9, 2019, from the Japanese Patent Office in counterpart application No. 2017-547673.
Communication dated Jun. 5, 2019 from the State Intellectual Property Office of the P.R.C. in counterpart Application No. 201680059479.3.
Communication dated Sep. 23, 2019, issued by the Korean Intellectual Property Office in corresponding Korean Application No. 10-2018-7008437.
Office Action dated Nov. 6, 2019 issued from the State Intellectual Property Office of P. R. China in Chinese Application No. 201680059479.3.

* cited by examiner

TRANSFER FILM, METHOD FOR MANUFACTURING FILM SENSOR, FILM SENSOR, FRONT PLATE-INTEGRATED SENSOR, AND IMAGE DISPLAY DEVICE

CROSS-REFERENCE TO RELATED APPLICATIONS

This application is a continuation application of International Application No. PCT/JP2016/078317, filed Sep. 26, 2016, the disclosure of which is incorporated herein by reference in its entirety. Further, this application claims priority from Japanese Patent Application No. 2015-210249, filed Oct. 26, 2015, Japanese Patent Application No. 2016-111468, filed Jun. 3, 2016, and Japanese Patent Application No. 2016-140527, filed Jul. 15, 2016, the disclosures of which are incorporated herein by reference in their entirety.

BACKGROUND OF THE INVENTION

1. Field of the Invention

The present invention relates to a transfer film, a method for manufacturing a film sensor, a film sensor, a front plate-integrated sensor, and an image display device. Specifically, the present invention relates to a front plate-integrated sensor which is an electrostatic capacitance-type input device capable of detecting locations touched by a finger from changes in electrostatic capacitance, a film sensor that can be used in the front plate-integrated sensor, a transfer film that is used to manufacture the film sensor, a method for manufacturing a film sensor using the transfer film, and an image display device including the front plate-integrated sensor as a constituent element.

2. Description of the Related Art

Recently, as electronic devices such as mobile phones, car navigations, personal computers, ticket vending machines, and bank terminals, there are electronic devices in which a tablet-type input device is disposed on the surface of a liquid crystal device or the like and information corresponding to command images is input by touching places displaying the command images with a finger, a stylus, or the like with reference to the command images displayed on an image display region in the liquid crystal device. To liquid crystal display windows of the above-described electronic devices, a cover glass is attached in order to protect the liquid crystal display window. In the related art, in the cover glass, a black frame-like light-blocking layer is formed in the rear surface peripheral portion of a transparent glass substrate.

In addition, in the above-described electronic devices, touch panels are frequently used. While resistance film-type touch panels are the current mainstream, in response to the multi-touch function that enables the size of an image to be increased or decreased by fingertip operations that tap, flip, and pinch the screen, the need for electrostatic capacitance-type touch panels is extremely intensifying due to their excellent visibility and durability. Among them, for electrostatic capacitance-type touch panels, there is a demand for the thickness reduction of sensor portions, and thus the expansion of the market of cover glass-integrated sensors obtained by attaching a film sensor to the rear surface of a cover glass using an electrostatic capacitance-type film sensor as disclosed by JP2012-133597A is expected.

JP2012-133597A describes a cover glass-integrated sensor including a cover glass for an electronic device display window in which a first frame-like light-blocking layer made of a screen printing film is formed in a rear surface peripheral portion of a transparent glass substrate and an electrostatic capacitance-type film sensor attached to the rear surface of the cover glass. The film sensor includes a transparent base body sheet, transparent conductive films respectively formed on both surfaces of the base body sheet so as to have an electrode pattern in the central window portion and a fine guidance circuit pattern in the outer frame portion, light-blocking conductive films laminated on the fine guidance circuit patterns in the transparent conductive films in the same width as that of the fine guidance circuit pattern, anti-rust functional layers respectively laminated on both surfaces of the base body sheet, on which the transparent conductive films and the light-blocking conductive films are formed, so as to cover the outer frame portions other than terminal portions, and a second frame-like light-blocking layer made of an exposed and developed substance of a color resist material which is formed a front surface peripheral portion of the base body sheet on which the transparent conductive film, the light-blocking conductive film, and the anti-rust functional layer are formed. In this cover glass-integrated sensor, the inner edge of the second frame-like light-blocking layer is located closer to the central side than the inner edge of the first frame-like light-blocking layer. According to JP2012-133597A, it is described that, due to the above-described constitution, it is possible to provide a cover glass-integrated sensor which has a sharp outline of a display screen that is visible through the cover glass, is excellent in terms of visibility, and has a sense of appearance unity in a portion surrounding the display screen.

Meanwhile, JP2013-228695A describes a black resin film which includes a black pigment, an alkali-soluble polymer compound, an ethylenic unsaturated bond-containing compound, and a photopolymerization initiator and has a bulk strength of 100 N/1.6 mm$\phi$($\phi$ represents the diameter) or more after the black resin film is heated at 240° C. for 80 minutes and then further heated at 300° C. for 30 minutes.

JP2013-228695A describes a method for manufacturing a black resin film including a step of applying a photosensitive resin composition including a black pigment, an alkali-soluble polymer compound, an ethylenic unsaturated bond-containing compound, and a photopolymerization initiator onto a base material, a step of exposing the photosensitive resin composition on the base material, a step of developing the exposed photosensitive resin composition, and a step of carrying out post exposure after the development step, in which the following condition (A) or condition (B) is satisfied.

Condition (A): The photopolymerization initiator is an α-aminoalkylphenone-based compound or an α-hydroxyalkylphenone-based compound.

Condition (B): The post exposure after the development step is carried out from both surfaces in a surface direction on a side of the photosensitive resin composition in contact with the base material and in a surface direction on a side not in contact with a transparent base material.

JP2013-228695A describes a method for manufacturing an electrostatic capacitance-type input device having a front plate and at least the following (1) to (4) elements on a noncontact side of the front plate, in which the (1) element is manufactured using the above-described method for manufacturing a black resin film:

(1) Decorative material, (2) A plurality of first transparent electrode patterns formed of a plurality of pad portions extending in a first direction through a connection portion, (3) A plurality of second electrode patterns which is electrically insulated from the first transparent electrode patterns and is made of a plurality of pad portions formed to extend in a direction intersecting the first direction, and (4) An insulating layer that electrically insulates the first transparent electrode patterns and the second electrode patterns.

SUMMARY OF THE INVENTION

As a result of studying the cover glass-integrated sensor described in JP2012-133597A, the present inventors found that, in a case in which an attempt is made to provide the second frame-like light-blocking layer made of the exposed and developed substance of the color resist material in the film sensor, even in the case of using the color resist material as it is, the color resist material is not sufficiently cured by polymerization by light due to the insufficient sensitivity. Furthermore, in the film sensor field, electrodes and the like are provided in a transparent base sheet, and thus it is found that there is a problem in that, in manufacturing processes, thermal treatments are only allowed at temperatures lower than the temperature (for example, approximately 130° C. to 170° C.) during the manufacturing of a cover glass-integrated sensor using the color resist and curing by a thermal treatment is not possible. Meanwhile, in the color resist material field, it is common that color resist materials are heated and cured at approximately 230° C.

In addition, JP2013-228695A only describes a black resin film for a decorative layer which is formed on a front plate side, and there is no description regarding a decorative layer that is formed on a film sensor side which is combined into the front plate. As a result of studying the method described in JP2013-228695A, the present inventors found that the decorative layer that is formed on the film sensor side can be heated only at a low temperature of approximately 130° C. to 170° C., and thus it is not possible to use the method described in JP2013-228695A in which an acrylic resin is heated at 240° C. and thus polymerized in the absence of an initiator and the like.

In an embodiment of the present invention, a transfer film which is preferred in the case of forming a decorative layer on at least one surface of a film sensor or the like and includes a coloring composition layer having a high optical density and a high sensitivity in an exposure step of the coloring composition layer, a method for manufacturing a film sensor using this transfer film, a film sensor, a front plate-integrated sensor, and an image display device.

The present inventors found that, in the case of forming a decorative layer on at least one surface of a film sensor, in a case in which the content or film thickness of a black pigment or a white pigment in a coloring composition layer is set in a specific range, the optical density of the coloring composition layer becomes high, and the sensitivity of the coloring composition layer in an exposure step can be increased.

Preferred aspects of the present invention include the following aspects.

[1] A transfer film for forming a decorative layer on at least one surface of a film sensor, the transfer film comprising: a temporary support; and a coloring composition layer including a black pigment or a white pigment, in which a content a (% by mass) of the black pigment or the white pigment in the coloring composition layer and a film thickness b (μm) of the coloring composition layer satisfy Expression 1, $$80 > a \times b > 10 \qquad \text{Expression 1.}$$

[2] A transfer film comprising: a temporary support; and a coloring composition layer including a black pigment or a white pigment, in which a content a (% by mass) of the black pigment or the white pigment in the coloring composition layer and a film thickness b (μm) of the coloring composition layer satisfy Expression 1, $$80 > a \times b > 10 \qquad \text{Expression 1.}$$

[3] The transfer film according to [1] or [2], in which the black pigment preferably includes carbon black, and the white pigment preferably includes titanium oxide particles.

[4] The transfer film according to [3], in which the carbon black preferably includes carbon black having a surface coated with a resin.

[5] The transfer film according to any one of [1] to [4], in which the film thickness of the coloring composition layer is preferably 0.5 μm to 10 μm.

[6] The transfer film according to any one of [1] to [5], in which the coloring composition layer preferably contains a polymerization initiator.

[7] The transfer film according to [6], in which the polymerization initiator preferably includes an oxime-based polymerization initiator.

[8] The transfer film according to [6] or [7], in which the coloring composition layer may contain a sensitizer.

[9] The transfer film according to any one of [1] to [8], in which the coloring composition layer preferably contains a thiol compound.

[10] The transfer film according to [9], in which the thiol compound preferably includes two or more thiol groups.

[11] The transfer film according to any one of [1] to [10], in which the coloring composition layer preferably contains a binder having a carboxyl group, and an acid value of the binder is preferably 50 mgKOH/g or more.

[12] The transfer film according to any one of [1] to [11], in which the coloring composition layer preferably contains a polymerizable compound having at least five ethylenic unsaturated groups.

[13] The transfer film according to any one of [1] to [12], in which a content of a compound including a halogen in the coloring composition layer is preferably 1% by mass or less.

[14] The transfer film according to any one of [1] to [13], preferably further comprising: particles other than the black pigment or the white pigment.

[15] A method for manufacturing a film sensor comprising: a step of forming a decorative layer by transferring the coloring composition layer from the transfer film according to any one of [1] to [14] to at least one surface of a film sensor including a transparent base sheet, an electrode pattern disposed on at least one surface of the base sheet, a guidance wire connected to the electrode pattern, and an overcoat layer laminated so as to cover the electrode pattern.

[16] The method for manufacturing a film sensor according to [15], preferably further comprising: a step of thermally treating the film sensor at 130° C. to 170° C. after the step of forming the decorative layer by transferring the coloring composition layer.

[17] The method for manufacturing a film sensor according to [15] or [16], in which one surface of the film sensor to which the coloring composition layer is transferred preferably includes a region of at least a part of the guidance wire and a region of at least a part of the overcoat layer.

[18] A film sensor comprising: a transparent base sheet; an electrode pattern disposed on at least one surface of the base sheet; a guidance wire connected to the electrode pattern; an overcoat layer laminated so as to cover the electrode pattern; and a coloring composition layer that is a transferred layer of the transfer film according to any one of [1] to [14] on at least one surface of the film sensor as a decorative layer.

[19] A front plate-integrated sensor comprising: a transparent front plate; and the film sensor according to [18].

[20] The front plate-integrated sensor according to [19] preferably further comprising: a second decorative layer on a region of a part of one surface of the front plate, in which the second decorative layer is preferably disposed between the front plate and the decorative layer of the film sensor, and an orthography of the second decorative layer observed in a normal direction to the front plate preferably superimposes a region of at least a part of the decorative layer of the film sensor.

[21] The front plate-integrated sensor according to [19] or [20], in which the front plate is preferably glass.

[22] An image display device comprising: the front plate-integrated sensor according to any one of [19] to [21].

According to the embodiment of the present invention, a transfer film which is preferred in the case of forming a decorative layer on at least one surface of a film sensor or the like and includes a coloring composition layer having a high optical density and a high sensitivity in an exposure step of the coloring composition layer, a method for manufacturing a film sensor using this transfer film, a film sensor, a front plate-integrated sensor, and an image display device.

DESCRIPTION OF THE PREFERRED EMBODIMENTS

Figure 1:
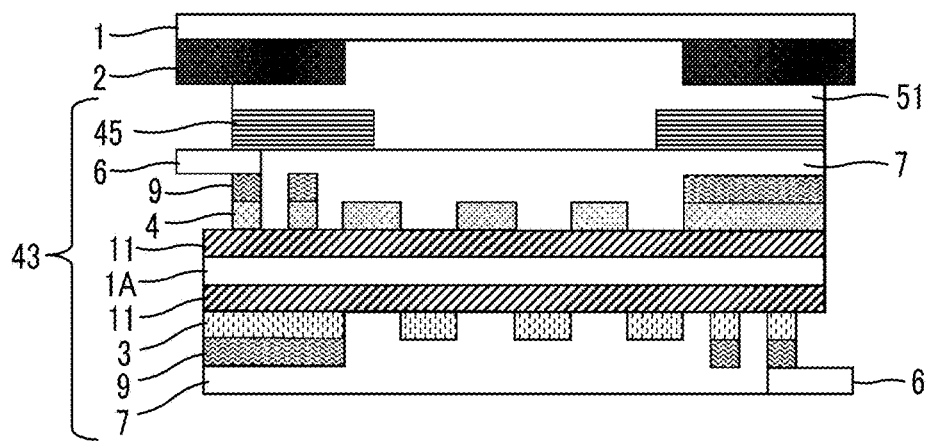
FIG. 1 is a cross-sectional schematic view illustrating an example of a constitution of a front plate-integrated sensor of the present disclosure.

Hereinafter, a transfer film, a method for manufacturing a film sensor, a film sensor, a front plate-integrated sensor, and an image display device of the present disclosure will be described.

Hereinafter, constituent requirements will be described on the basis of typical embodiments and specific examples of the present disclosure in some cases, but the present disclosure is not limited to these embodiments and specific examples.

Meanwhile, in the present specification, numerical ranges expressed using "to" include numerical values before and after "to" as the lower limit value and the upper limit value.

In the present specification, the terminology "step" refers not only to an independent step but also to an operation which cannot be clearly differentiated from other steps but contributes to the achievement of the intended object of the step.

Meanwhile, there will be cases in which common constituent elements expressed using the same reference sign in the respective drawings will not be described.

[Transfer Film]

A transfer film in an embodiment of the present invention is a transfer film for forming a decorative layer on at least one surface of a film sensor, and the transfer film has a temporary support and a coloring composition layer in which a content a (% by mass) of a black pigment or a white pigment and a film thickness b (μm) satisfy Expression 1 below. In addition, a transfer film in another embodiment of the present invention is a transfer film which is also used in applications other than an application of forming a decorative layer in a film sensor, and the transfer film has a temporary support and a coloring composition layer in which the content a (% by mass) of a black pigment or a white pigment and the film thickness b (μm) satisfy Expression 1 below.

$$80 > a \times b > 10 \qquad \text{Expression 1}$$

The transfer film in the embodiment of the present invention is a transfer film for forming a decorative layer on at least one surface of a film sensor. In this case, the decorative layer is a layer having a role of hiding a light-blocking conductive film.

In the transfer film of the present disclosure, the coloring composition layer has a high optical density and a high sensitivity in an exposure step. The value of a×b which is the product of the content a (% by mass) of the black pigment or the white pigment in the coloring composition layer in the transfer film and the film thickness b (μm) of the coloring composition layer in the transfer film is preferably greater than a specific lower limit value (10) from the viewpoint of increasing the optical density. The value of a×b is more preferably greater than 20, still more preferably greater than 30, and particularly preferably 50 or more. On the other hand, from the viewpoint of increasing the sensitivity, the value of a×b which is the product of the content a (% by mass) of the black pigment or the white pigment in the coloring composition layer in the transfer film and the film thickness b (μm) of the coloring composition layer in the transfer film is preferably smaller than a specific upper limit value (80), and the value of a×b is more preferably smaller than 40.

Hereinafter, a preferred aspect of the transfer film of the present disclosure will be described.

<Constitution>

Figure 13:
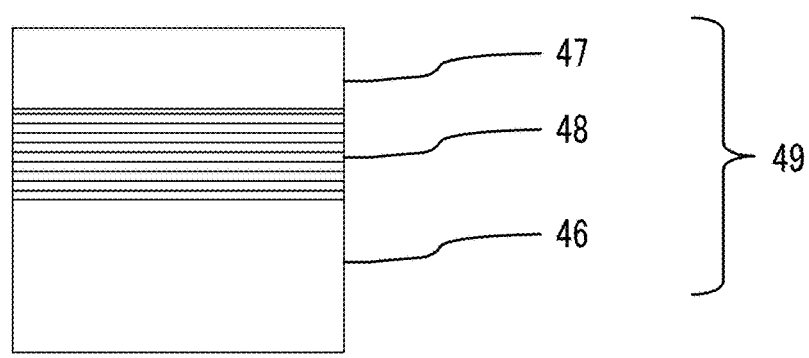
FIG. 13 is a cross-sectional schematic view illustrating an example of a constitution of a transfer film of the present disclosure.

FIG. 13 illustrates an example of a preferred constitution of the transfer film of the present disclosure. FIG. 13 is a schematic view of a transfer film 49 in which a temporary support 46, a coloring composition layer 48, and a protective peeling layer (protective film) 47 are laminated in this order adjacent to one another.

Figure 11A:
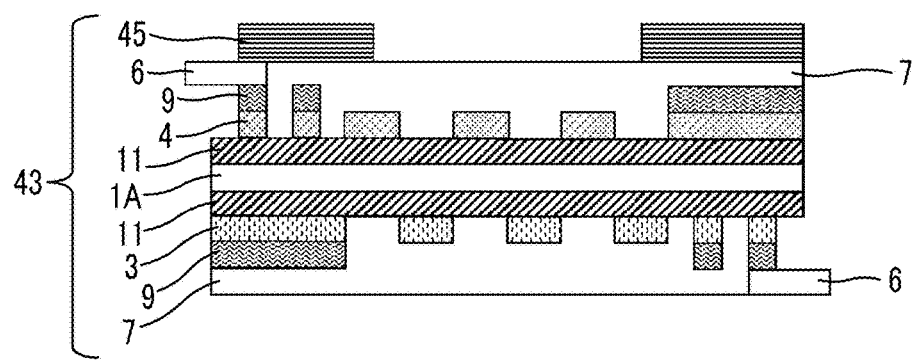
FIG. 11A is a schematic view of an example of a film sensor of the present disclosure.
Figure 11B:
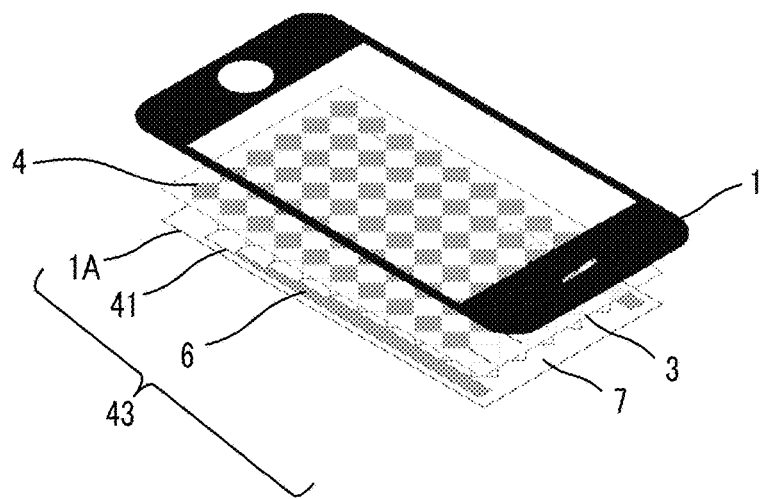
FIG. 11B is a schematic view of an example of the film sensor of the present disclosure.

Schematic views of an example of a film sensor of the present disclosure including a decorative layer 45 formed by transferring the coloring composition layer 48 from the transfer film of the present disclosure in a case in which the transfer film of the present disclosure is used to form a decorative layer on at least one surface of a film sensor are illustrated in FIG. 11A and FIG. 11B.

The constitution of the film sensor of the present disclosure and a method for forming a decorative layer on at least one surface of a film sensor using the transfer film of the present disclosure will be described below.

<Coloring Composition Layer>

The transfer film of the present disclosure is a transfer film which has a coloring composition layer including a black pigment or a white pigment and in which the content a (% by mass) of the black pigment or the white pigment in the coloring composition layer and the film thickness b (μm) of the coloring composition layer satisfy Expression 1 below.

$$80 > a \times b > 10 \quad \text{Expression 1}$$

In the transfer film of the present disclosure, the content of a compound including a halogen in the coloring composition layer is preferably 1% by mass or less from the viewpoint of the absence of halogen and more preferably 0.2% by mass or less.

(Black Pigment or White Pigment)

The content of the black pigment or the white pigment in the coloring composition layer is calculated with respect to the total solid content of the coloring composition layer other than a solvent. The total solid content mentioned in the present specification refers to the total mass of non-volatile components in the coloring composition layer excluding the solvent or the like.

In the coloring composition layer, the content of the black pigment or the white pigment is preferably greater than 3% by mass and 40% by mass or less, more preferably 25% by mass or less, more preferably 3% by mass to 20% by mass, particularly preferably 5% by mass to 18% by mass, and more particularly preferably 10% by mass to 18% by mass with respect to the total solid content of the coloring composition layer other than the solvent. The content of the black pigment or the white pigment is preferably great from the viewpoint of increasing the optical density while maintaining the film thickness to be thin. The content of the black pigment or the white pigment is preferably 25% by mass or less from the viewpoint of the sensitivity.

The black pigment is not particularly limited within the scope of the gist of the present disclosure.

As the black pigment that is used in the present disclosure, it is possible to preferably use well-known black pigments (organic pigments, inorganic pigments, and the like).

From the viewpoint of the optical density, examples of the black pigment include carbon black, titanium carbide, iron oxide, titanium oxide, graphite, and the like, and, among these, carbon black is preferred.

The carbon black that can be used in the transfer film of the present disclosure is preferably carbon black having a surface coated with a resin from the viewpoint of the surface resistance.

The white pigment is not particularly limited within the scope of the gist of the present disclosure, but is more preferably a white inorganic pigment.

As the white inorganic pigment, it is possible to use the white pigments described in Paragraphs 0015 and 0114 of JP2005-7765A.

Specifically, the white inorganic pigment is preferably titanium oxide, zinc oxide, lithopone, light calcium carbonate, white carbon, aluminum oxide, aluminum hydroxide, or barium sulfate, more preferably titanium oxide or zinc oxide, and particularly preferably titanium oxide. Among these, the white inorganic pigment is more preferably rutile-type or anatase-type titanium oxide and still more preferably rutile-type titanium oxide.

The surface of titanium oxide can be subjected to a silica treatment, an alumina treatment, a titania treatment, a zirconia treatment, or an organic substance treatment, and these treatments may be jointly used.

In such a case, it is possible to suppress the catalytic activity of titanium oxide and improve heat resistance, a light-vanishing property, and the like.

From the viewpoint of decreasing the thickness (the value of b) of the heated coloring composition layer, the surface treatment on the surface of titanium oxide is preferably at least one treatment of an alumina treatment and a zirconia treatment and particularly preferably a treatment in which alumina and zirconia are jointly used.

In the transfer film of the present disclosure, the black pigment or the white pigment is preferably carbon black or titanium oxide particles.

The black pigment (preferably carbon black) or the white pigment is desirably used as a dispersion liquid. This dispersion liquid can be prepared by adding and dispersing a composition obtained by mixing the black pigment or the white pigment and a pigment dispersant in advance to and in an organic solvent described below (or a vehicle). The vehicle refers to a part of a medium in which the pigment is dispersed when paint is in a liquid state and includes a liquid-phase component (binder) that is bonded with the black pigment or the white pigment and thus forms a coated film and a component that dissolves and dilutes the above-described component (organic solvent).

A disperser that is used during the dispersion of the black pigment or the white pigment is not particularly limited, and examples thereof include well-known dispersers such as a kneader, a roll mill, an attritor, a super mill, a dissolver, a homogenizer, and a sand mill which are described in Section 438 of "Pigment Dictionary", Kunizou Asakura, $1^{st}$ edition, Asakura Publishing Co., Ltd., 2000. Furthermore, the pigment may be finely ground using a friction force by means of the mechanical grinding described in p. 310 of the same publication.

Meanwhile, the dispersant may be selected depending on the pigment and the solvent, and it is possible to use, for example, commercially available dispersants.

From the viewpoint of the dispersion stability, the number-average particle diameter of the black pigment or the white pigment is preferably 0.001 μm to 0.1 μm and more preferably a colorant of 0.01 μm to 0.08 μm.

Meanwhile, the "particle diameter" refers to the diameter of a circle having the same area as the particle in an electron micrograph image, and the "number-average particle diameter" refers to the average value of the obtained particle diameters of any 100 particles.

The transfer film of the present disclosure may be a negative-type material or a positive-type material.

In a case in which the transfer film of the present disclosure is a negative-type material, the coloring composition layer preferably includes other particles other than the black pigment or the white pigment, a polymerizable compound, a binder (preferably an alkali-soluble resin), a polymerization initiator, a thiol, and a solvent. Furthermore, additives and the like may also be used, but components in the layer are not limited thereto.

Unlike a coloring composition layer in a transfer film for a second decorative layer (mask layer) application described below or a coloring composition layer in a transfer film for a color filter application which is provided in a front plate that is heated at approximately 230° C. to 240° C. in the end, the coloring composition layer in the transfer film for a film sensor application is heated at a maximum of approximately 130° C. to 170° C. in the end. Therefore, it is almost impossible to expect that the coloring composition layer in the transfer film for the film sensor application is polymerized by heating. Therefore, the composition of the coloring composition layer in the transfer film for the film sensor application is preferably a composition that can be sufficiently polymerized by photopolymerization, but is different from a preferred composition of the coloring composition layer in the transfer film for the second decorative layer application or the coloring composition layer in the transfer film for a color filter application which is provided in the front plate.

(Other Particles)

To the coloring composition layer, other particles other than the black pigment or the white pigment are preferably added from the viewpoint of the transferring property as long as the effects of the disclosure are not impaired. In a case in which, among the other particles, a pigment is used, the pigment is desirably uniformly dispersed in the coloring composition layer, and thus the particle diameter is preferably 0.1 μm or less and particularly preferably 0.08 μm or less.

Examples of the other particles include Victoria Pure Blue BO (Color Index (hereinafter C. I.) 42595), Auramine (C. I. 41000), Fat Black HB (C. I. 26150), Mono Light Yellow GT (C. I. Pigment Yellow 12), Permanent Yellow GR (C. I. Pigment Yellow 17), Permanent Yellow HR (C. I. Pigment Yellow 83), Permanent Carmine FBB (C. I. Pigment Red 146), Hostar Balm Red ESB (C. I. Pigment Violet 19), Permanent Ruby FBH (C. I. Pigment Red 11), Fasstar Pink B Supra (C. I. Pigment Red 81), Monastral Fast Blue (C. I. Pigment Blue 15), Mono Light Fast Black B (C. I. Pigment Black 1), and carbon, C. I. Pigment Red 97, C. I. Pigment Red 122, C.I. Pigment Red 149, C. I. Pigment Red 168, C. I. Pigment Red 177, C. I. Pigment Red 180, C. I. Pigment Red 192, C. I. Pigment Red 215, C. I. Pigment Green 7, C. I. Pigment Blue 15:1, C. I. Pigment Blue 15:4, C. I. Pigment Blue 22, C. I. Pigment Blue 60, C. I. Pigment Blue 64, C. I. Pigment Violet 23, and the like.

Among the other particles, examples of the other particles that can be preferably added to the coloring composition layer include C. I. Pigment Red 177.

The content of the other particles with respect to the black pigment or the white pigment is preferably 30% by mass or less, more preferably 3% to 20% by mass, and particularly preferably 5% to 15% by mass.

(Polymerizable Compound)

The polymerizable compound that is used in the coloring composition layer is preferably a photopolymerizable compound. A photopolymerizable group in the photopolymerizable compound is not particularly limited, and examples thereof include an ethylenic unsaturated group, an epoxy group, and the like. The polymerizable compound that is used in the coloring composition layer is preferably an ethylenic unsaturated bond-containing compound and more preferably includes a compound having a (meth)acryloyl group.

As the ethylenic unsaturated bond-containing compound, it is possible to use the polymerizable compounds described in Paragraphs 0023 and 0024 of JP4098550B, difunctional polymerizable compounds such as tricyclodecane diol dimethanol diacrylate, and the like.

In the coloring composition layer, it is possible to preferably use polymerizable compounds having at least five ethylenic unsaturated groups such as dipentaerythritol hexaacrylate (DPHA), dipentaerythritol (penta/hexa)acrylate, and tripentaerythritol octaacrylate; urethane-based monomers such as urethane (meth)acrylate compounds; and difunctional polymerizable compounds such as ethoxylated bisphenol A diacrylate and tricyclodecanediol dimethanol diacrylate.

In the transfer film of the present disclosure, the coloring composition layer preferably includes the polymerizable compound having at least five ethylenic unsaturated groups from the viewpoint of the sensitivity.

One kind of the photopolymerizable compound may be used singly or two or more kinds of the photopolymerizable compounds may be used in combination, but two or more kinds of the photopolymerizable compounds are preferably used in combination from the viewpoint of the sensitivity. As the polymerizable compound that is used in the coloring composition layer in the transfer film of the present disclosure, the polymerizable compound having at least five ethylenic unsaturated groups and the difunctional polymerizable compound are preferably used in combination. The content of the difunctional polymerizable compound used is preferably in a range of 10% to 90% by mass, more preferably in a range of 20% to 85% by mass, and particularly preferably in a range of 30% to 80% by mass of all of the polymerizable compounds. The content of the polymerizable compound having at least five ethylenic unsaturated groups used is preferably in a range of 10% to 90% by mass, more preferably in a range of 15% to 80% by mass, and particularly preferably in a range of 20% to 70% by mass of all of the polymerizable compounds.

The average molecular weight of the polymerizable compound is preferably 200 to 3,000, more preferably 250 to 2,600, and particularly preferably 280 to 2,200.

In the coloring composition layer, the ratio of the polymerizable compound to the binder (the content of the polymerizable compound/the content of the binder) is preferably 0.1 to 2 times, more preferably 0.2 to 1.5 times, and particularly preferably 0.3 to 1 time.

(Binder)

The binder that is used in the coloring composition layer is not particularly limited within the scope of the gist of the present disclosure, can be appropriately selected from well-known binders, and is preferably an alkali-soluble polymer compound.

As the alkali-soluble polymer compound, it is possible to use, for example, the polymers described in Paragraph 0025 of JP2011-95716A and the polymers described in Paragraphs 0033 to 0052 of JP2010-237589A.

The alkali-soluble polymer compound is preferably an acrylic polymer containing a structural unit derived from (meth)acrylate and a structural unit derived from a (meth) acrylic acid ester.

In the transfer film of the present disclosure, the coloring composition layer preferably contains a binder having a carboxyl group from the viewpoint of improving the edge roughness.

In the transfer film of the present disclosure, the acid value of the binder is preferably 50 mgKOH/g or more from the viewpoint of improving the edge roughness, more preferably 60 mgKOH/g or more, and particularly preferably 65 mgKOH/g or more.

The binder that is used in the coloring composition layer is not particularly limited, and it is possible to use random copolymers of benzyl methacrylate/methacrylic acid, glycidyl methacrylate adducts of cyclohexyl methacrylate (a)/ methyl methacrylate (b)/methacrylic acid (c), copolymers of allyl methacrylate/methacrylic acid, and copolymers of benzyl methacrylate/methacrylic acid/hydroxyethyl methacrylate.

The weight-average molecular weight (Mw) of the binder that is used in the coloring composition layer is not particularly limited, but is preferably 4,000 to 200,000, more preferably 4,500 to 100,000, and particularly preferably 5,000 to 60,000.

In the present specification, the weight-average molecular weight (Mw) can be measured by means of gel permeation chromatography (GPC) under the following conditions. The calibration curve is produced from eight samples of Tosoh Corporation's "standard specimen TSK standard, polystyrene": "F-40", "F-20", "F-4", "F-1", "A-5000", "A-2500", "A-1000", and "n-propylbenzene".

—Conditions—

GPC: HLC (registered trademark)-8020GPC (manufactured by Tosoh Corporation)

Column: Three TSkgel (registered trademark), Super Multipore HZ-H (manufactured by Tosoh Corporation, 4.6 mmID×15 cm)

Eluent: Tetrahydrofuran (THF)

Specimen concentration: 0.45% by mass

Flow rate: 0.35 ml/min

Sample injection amount: 10 μl

Measurement temperature: 40° C.

Detector: Differential refractometer (R1)

(Polymerization Initiator)

The coloring composition layer preferably contains a polymerization initiator.

The polymerization initiator that is used in the coloring composition layer is preferably a photopolymerization initiator.

As the photopolymerization initiator, it is possible to use the polymerization initiators described in Paragraphs 0031 to 0042 of JP2011-95716A and the oxime-based polymerization initiators described in Paragraphs 0064 to 0081 of JP2015-014783A. For example, it is possible to preferably use 1,2-octane dione-1-[4-(phenylthio)-2-(O-benzoyloxime)] (trade name: IRGACURE OXE-01, manufactured by BASF), additionally, ethane-1-one, [9-ethyl-6-(2-methylbenzoyl)-9H-carbazole-3-yl]-1-(O-acetyloxime) (trade name: IRGACURE OXE-02, manufactured by BASF), 2-(dimethylamino)-2-[(4-methylphenyl)methyl]-1-[4-(4-morpholinyl)phenyl]-1-butanone (trade name: IRGACURE 379EG, manufactured by BASF), 2-methyl-1-(4-methyl thiophenyl)-2-morpholino-propan-1-one (trade name: IRGACURE 907, manufactured by BASF), 2-hydroxy-1-{4-[4-(2-hydroxy-2-methyl-propionyl)-benzyl]phenyl}-2-methyl-propan-1-one (trade name: IRGACURE 127, manufactured by BASF), 2-benzyl-2-dimethylamino-1-(4-morpholinophenyl)-butanone-1 (trade name: IRGACURE 369, manufactured by BASF), 2-hydroxy-2-methyl-1-phenyl-erypropan-1-one (trade name: IRGACURE 1173, manufactured by BASF), 1-hydroxy-cyclohexyl-phenyl-ketone (trade name: IRGACURE 184, manufactured by BASF), 2,2-dimethoxy-1,2-diphenyl ethan-1-one (trade name: IRGACURE 651, manufactured by BASF), oxime ester-based trade name: Lunar 6 (manufactured by DKSH Japan K.K.), 2,4-diethylthioxanthone ("KAYACURE DETX-S" manufactured by Nippon Kayaku Co., Ltd.), DFI-091 and DFI-020 which are fluorine oxime-based polymerization initiators (both manufactured by Daito Chemix Co., Ltd.), and the like.

Among these, other initiators other than halogen-containing polymerization initiators such as trichloromethyl triazine-based compounds that are used for color filter materials and the like are preferably used from the viewpoint of increasing the sensitivity, and oxime-based polymerization initiators such as α-aminoalkylphenone-based compounds, α-hydroxyalkylphenone-based compounds, and oxime ester-based compounds are more preferred. In the transfer film of the present disclosure, the coloring composition layer particularly preferably includes the oxime-based polymerization initiator from the viewpoint of increasing the sensitivity.

One kind of the polymerization initiator may be used singly or two or more kinds of the polymerization initiators may be used in combination.

The mass ratio of the polymerization initiator with respect to the polymerizable compounds in the coloring composition layer is preferably 0.05 to 0.125 from the viewpoint of the taper angle and precipitation suppression and more preferably 0.070 to 0.100.

The content of the polymerization initiator is preferably 0.1% by mass or more, more preferably 0.5% by mass or more, and still more preferably 1.0% by mass or more of the solid content amount of the coloring composition layer.

In addition, the content of the polymerization initiator is preferably 20% by mass or less and more preferably 10% by mass or less of the solid content amount of the coloring composition layer.

(Thiol Compound)

In the transfer film of the present disclosure, the coloring composition layer preferably contains a thiol compound from the viewpoint of increasing the sensitivity. The thiol compound may be any of a monofunctional thiol compound in which the number of functional groups that is the number of thiol groups (also referred to as mercapto groups) is one or a difunctional thiol compound in which the number of functional groups that is the number of thiol groups (also referred to as mercapto groups) is two. In the transfer film of the present disclosure, the thiol compound is preferably di- or higher-functional from the viewpoint of increasing the sensitivity, more preferably di- to tetrafunctional, and particularly preferably di- or trifunctional.

Examples of the monofunctional thiol compound that is used in the coloring composition layer include N-phenyl mercaptobenzimidazole and the like.

Examples of the di- or higher-functional thiol compound that is used in the coloring composition layer include 1,4-bis(3-mercaptobutyryloxy)butane (KARENZMT BD1 manufactured by Showa Denko K. K.), 1,3,5-tris(3-mercaptobutyryloxyethyl)-1,3,5-triazine-2,4,6(1H, 3H, 5H)-trione (KARENZMT NR1 manufactured by Showa Denko K. K.), pentaerythritol tetrakis(3-mercaptobutyrate) (KARENZMT PE1 manufactured by Showa Denko K. K.), pentaerythritol tetrakis(3-mercaptopropionate) ("PEMP" manufactured by Sakai chemical Industry Co., Ltd.), and the like.

One kind of the thiol compound may be used singly or two or more kinds of the thiol compounds may be used in combination.

(Sensitizer)

In the transfer film of the present disclosure, the coloring composition layer may contain a sensitizer depending on the exposure conditions.

The sensitizer that can be used in the present disclosure can be used without any particular limitations as long as the sensitizer absorbs active light rays and sensitizes the polymerization initiator with an electron migration mechanism or an energy migration mechanism.

The sensitizer is preferably an anthracene derivative, an acridone derivative, a thioxanthone derivative, a coumarin derivative, a base styryl derivative, or a distyryl benzene derivative.

As the anthracene derivative, anthracene, 9,10-dibutoxyanthracene, 9,10-dichloroanthracene, 2-ethyl-9,10-dimethoxyanthracene, 9-hydroxymethylanthracene, 9-bromoanthracene, 9-chloroanthracene, 9,10-dibromoanthracene, 2-ethylanthracene, and 9,10-dimethoxyanthracene are preferred.

As the acridone derivative, acridone, N-butyl-2-chloroacridone, N-methylacridone, 2-methoxyacridone, and N-ethyl-2-methoxyacridone are preferred.

As the thioxanthone derivatives, thioxanthone, diethylthioxanthone, 1-chloro-4-propoxythioxanthone, 2-chlorothioxanthone, 2-isopropylthioxanthone, and 4-isopropylthioxanthone are preferred.

As the coumarin derivative, coumarin-1, coumarin-6H, coumarin-110, or coumarin-102 is preferred.

Examples of the base styryl derivative include 2-(4-dimethylaminostyryl) benzoxazole, 2-(4-dimethylaminostyryl) benzothiazole, and 2-(4-dimethylaminostyryl) naphthothiazole.

Examples of the distyrylbenzene derivative include distyrylbenzene, di(4-methoxystyryl) benzene, and di(3,4,5-trimethoxystyryl) benzene.

Specific examples of the sensitizer include compounds illustrated below. Meanwhile, in the compounds illustrated below, Me represents a methyl group, Et represents an ethyl group, and Bu represents a butyl group.

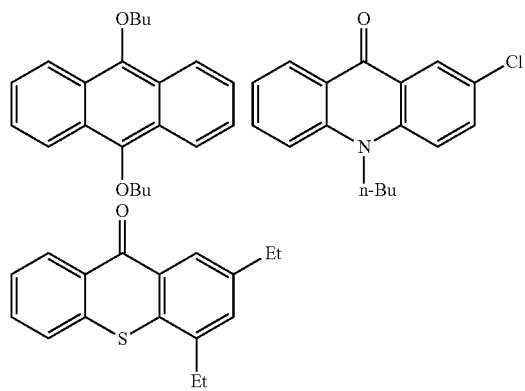

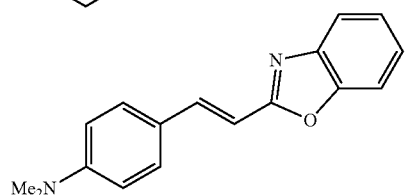

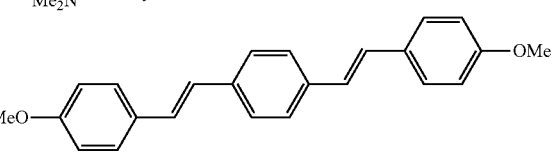

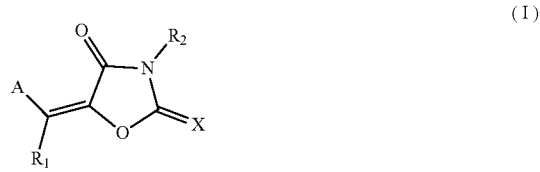

In addition, from the viewpoint of a high sensitivity, a compound represented by General Formula (I) (sensitizing dye) may be used as the sensitizer.

(I)

$$\text{structure}$$

In General Formula (I), A represents an aromatic cyclic residue or a heterocyclic residue, and X represents an oxygen atom, a sulfur atom, or N—($R_3$). $R_1$, $R_2$, and $R_3$ each independently represent a hydrogen atom, a halogen atom, or a monovalent non-metallic atomic group, and A and $R_1$ and $R_2$ and $R_3$ may be bonded to each other in order to form an aliphatic or aromatic ring.

General Formula (I) will be described in more detail.

In General Formula (I), $R_1$, $R_2$, and $R_3$ each independently represent a hydrogen atom, a halogen atom, or a monovalent non-metallic atomic group. Preferred examples of the monovalent non-metallic atomic group as $R_1$, $R_2$, or $R_3$ include substituted or unsubstituted alkyl groups, substituted or unsubstituted alkenyl groups, substituted or unsubstituted aryl groups, substituted or unsubstituted aromatic heterocyclic residues, substituted or unsubstituted alkoxy groups, substituted or unsubstituted alkylthio groups, and hydroxyl groups.

Examples of the alkyl groups as $R_1$, $R_2$, or $R_3$ include linear, branched, or cyclic alkyl groups having 1 to 20 carbon atoms, and, among these, linear alkyl groups having 1 to 12 carbon atoms (for example, a methyl group, an ethyl group, a propyl group, and the like), branched alkyl groups having 3 to 12 carbon atoms (for example, an i-propyl group, an i-butyl group, a t-butyl group, and the like), and cyclic alkyl groups having 5 to 10 carbon atoms (for example, a cyclohexyl group and the like) are more preferred.

Examples of the alkenyl groups as $R_1$, $R_2$, or $R_3$ include a 1-propenyl group and the like.

Examples of the aryl groups as $R_1$, $R_2$, or $R_3$ include a phenyl group, a tosyl group, and the like.

Examples of the aromatic heterocyclic residues as $R_1$, $R_2$, or $R_3$ include groups having a monocyclic or polycyclic aromatic ring having at least one of a nitrogen atom, a carbon atom, or a sulfur atom (for example, a pyridyl group and the like).

Examples of the halogen atom as $R_1$, $R_2$, or $R_3$ include a fluorine atom (—F), a bromine atom (—Br), a chlorine atom (—Cl), and an iodine atom (—I).

Substituents that the alkyl groups, the alkenyl groups, the aryl groups, the aromatic heterocyclic residues, the alkoxy groups, or the alkylthio groups as $R_1$, $R_2$, or $R_3$ may have are not particularly limited as long as the substituents can be introduced into the above-described groups.

In General Formula (I), A represents an aromatic cyclic residue or a heterocyclic residue, and the aromatic cyclic residue or the heterocyclic residue may be not substituted or may have a substituent.

The aromatic cyclic residue represented by A is the same as the "substituted or unsubstituted aryl groups" as $R_1$, $R_2$, or $R_3$, and specific examples and preferred aspects thereof are also the same as those. In addition, the heterocyclic residue represented by A is the same as the "substituted or unsubstituted aromatic heterocyclic residues" as $R_1$, $R_2$, or $R_3$, and specific examples and preferred aspects thereof are also the same as those.

The compound represented by General Formula (I) (sensitizing dye) can be obtained from a condensation reaction between the acidic nucleus described in JP5075450B or an acidic nucleus having an active methylene group and a substituted or unsubstituted aromatic ring or heterocyclic ring and can be synthesized with reference to JP1984-28329B (JP-S59-28329B).

Hereinafter, preferred specific examples (D1 to D9) of the compound represented by General Formula (I) will be illustrated, but the compound is not limited thereto. Meanwhile, isomers formed by a double bond between an acidic nucleus and a basic nucleus are not limited to any isomers.

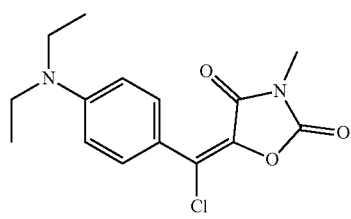

(D1)

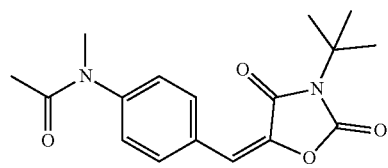

(D2)

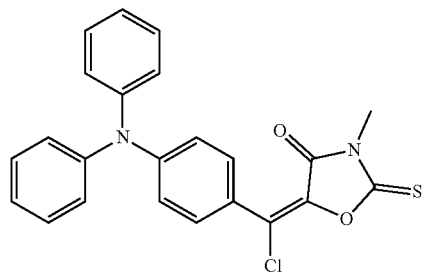

(D3)

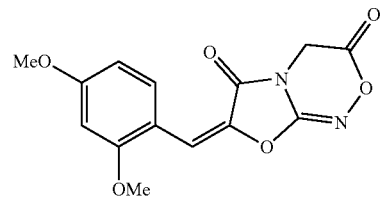

(D4)

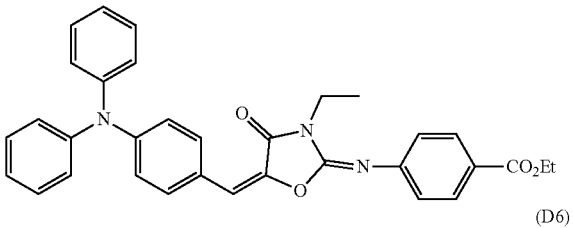

(D5)

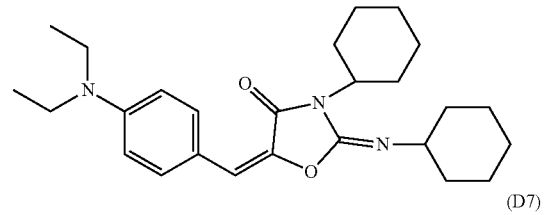

(D6)

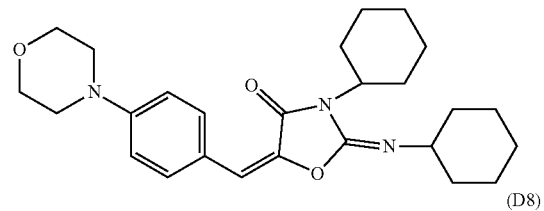

(D7)

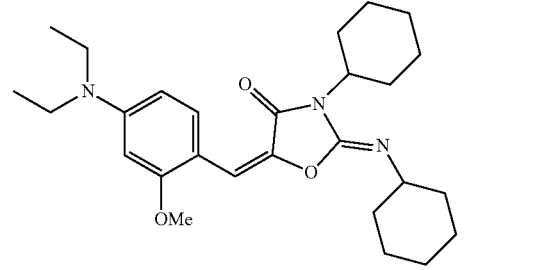

(D8)

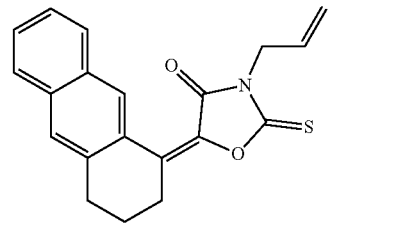

(D9)

As the sensitizer, a commercially available sensitizer may be used or the sensitizer may also be synthesized using a well-known synthesis method.

In addition, one kind of the sensitizer may be used singly or two or more kinds of the sensitizers may be used in combination.

From the viewpoint of the sensitivity, the content of the sensitizer is preferably 20 to 300 parts by mass and particularly preferably 30 to 200 parts by mass with respect to 100 parts by mass of the polymerization initiator.

(Metallic Oxidation Retarder)

The coloring composition layer in the transfer film of the present disclosure may include a metallic oxidation retarder as necessary in order to impart a protection property to a metal wire portion (an electrode pattern or a routed wire) by carrying out a surface treatment on the metal wire portion in a region from which an insulating layer or the decorative layer is removed. The metallic oxidation retarder that is used in the present disclosure is preferably a compound having an aromatic ring including a nitrogen atom in the molecule.

In addition, in the metallic oxidation retarder that is used in the present disclosure, the aromatic ring including a nitrogen atom is preferably at least one ring selected from the group consisting of an imidazole ring, a triazole ring, a tetrazole ring, a thiadiazole ring, and condensed rings of the above-described ring and another aromatic ring, and the aromatic ring including a nitrogen atom is more preferably an imidazole ring or a condensed ring of an imidazole ring and another aromatic ring.

The another aromatic ring may be a homocyclic ring or a heterocyclic ring, but is preferably a homocyclic ring, more preferably a benzene ring or a naphthalene ring, and still more preferably a benzene ring.

Preferred examples of preferred metallic oxidation retarders include imidazole, benzimidazole, tetrazole, mercaptothiadiazole, and benzotriazole, and imidazole, benzimidazole, and benzotriazole are more preferred.

In addition, the content of the metallic oxidation retarder is preferably 0.1% to 20% by mass, more preferably 0.5% to 10% by mass, and still more preferably 1% to 5% by mass of the total mass of the coloring composition layer that is used in the present disclosure.

(Additives)

In the coloring composition layer, additives may be used. Examples of the additives include the surfactants described in Paragraph 0017 of JP4502784B and Paragraphs 0060 to 0071 of JP2009-237362A, the thermopolymerization inhibitors (also referred to as polymerization inhibitors, preferably phenothiazine) described in Paragraph 0018 of JP4502784B, and other additives described in Paragraphs 0058 to 0071 of JP2000-310706A.

(Solvent)

The coloring composition layer preferably further includes a solvent.

Examples of the solvent that may be included in the coloring composition layer manufactured by coating include the following solvents.

As the solvent, it is possible to use ordinarily-used solvents without any particular limitations. Specific examples thereof include esters, ethers, ketones, aromatic hydrocarbons, and the like.

In addition, methyl ethyl ketone, propylene glycol monomethyl ether, propylene glycol monomethyl ether acetate, cyclohexanone, cyclohexanol, methyl isobutyl ketone, ethyl lactate, methyl lactate, and the like which are the same solvents as those described in Paragraphs 0054 and 0055 in the specification of US2005/282073A1 can also be preferably used in the present disclosure.

Among the above-described solvents, 1-methoxy-2-propyl acetate, methyl 3-ethoxypropionate, ethyl 3-ethoxypropionate, ethyl cellosolve acetate, ethyl lactate, butyl acetate, methyl 3-methoxypropionate, 2-heptanone, cyclohexanone, diethylene glycol monoethyl ether acetate (ethyl carbitol acetate), diethylene glycol monobutyl ether acetate (butyl carbitol acetate), propylene glycol methyl ether acetate, methyl ethyl ketone, and the like are preferably used as the solvent in the present disclosure.

One kind of the solvent may be used singly or two or more kinds of the solvents may be used in combination.

In addition, an organic solvent having a boiling point of 180° C. to 250° C. (high-boiling-point solvent) can be used as necessary. Examples of the high-boiling-point solvent include diethylene glycol monobutyl ether, diethylene glycol monoethyl ether acetate, diethylene glycol monoethyl ether, 3,5,5-trimethyl-2-cyclohexene-1-one, dipropylene glycol monomethyl ether acetate, propylene glycol diacetate, propylene glycol-n-propyl ether acetate, diethylene glycol diethyl ether, 2-ethylhexyl acetate, 3-methoxy-3-methylbutyl acetate, γ-butyrolactone, tripropylene glycol methylethyl acetate, dipropylene glycol-n-butyl acetate, propylene glycol phenyl ether acetate, 1,3-butanediol diacetate, and the like.

As the solvent, the coloring composition layer preferably includes a first solvent having an evaporation rate that is equal to or more than 200% of butyl acetate and a second solvent having an evaporation rate that is equal to or less than 50% of butyl acetate. The coloring composition layer preferably includes a solvent that is a polyhydric alcohol derivative and a solvent that is a ketone as the solvent.

(Film Thickness)

In the transfer film of the present disclosure, the film thickness of the coloring composition layer is preferably 0.5 μm to 10 μm from the viewpoint of the designability during the attachment of the coloring composition layer to the front plate, more preferably 1.0 μm to 8.0 μm, and particularly preferably 1.5 μm to 5.0 μm.

<Temporary Support>

The transfer film of the present disclosure preferably has a temporary support.

As a material of the temporary support, it is possible to use flexible materials.

Examples of the temporary support include cycloolefin copolymer films, polyethylene terephthalate films (hereinafter, also referred to as "PET"), triacetyl cellulose films, polystyrene films, polycarbonate films, and the like, and, among these, from the viewpoint of handling, PET is particularly preferred.

In addition, the temporary support may be transparent and may contain dyed silicon, an alumina sol, a chromium salt, a zirconium salt, or the like.

In addition, the temporary support can be imparted with a conductive property using the method described in JP2005-221726A.

<Other Layers>

The transfer film of the present disclosure may further include a thermoplastic resin layer and an interlayer between the temporary support and the coloring composition layer.

(Thermoplastic Resin Layer)

A component that is used for the thermoplastic resin layer is preferably the organic polymer substance described in JP1993-72724A (JP-H05-72724A) and preferably a component selected from organic polymer substances having a softening point of approximately 80° C. or lower which is obtained using the Vicat method (specifically, the polymer softening point measurement method based on American Society for Testing and Material (ASTM) D1235). Specific examples thereof include organic polymers such as polyolefins such as polyethylene and polypropylene, ethylene copolymers of ethylene and vinyl acetate or a saponified substance thereof, ethylene copolymers of ethylene and an acrylic acid ester or a saponified substance thereof, vinyl chloride copolymers of polyvinyl chloride or vinyl chloride and vinyl acetate or a saponified substance thereof, polyvinylidene chloride, vinylidene chloride copolymers, polystyrene, styrene copolymers of styrene and a (meth)acrylic acid ester or a saponified substance thereof, polyvinyl toluene, vinyl toluene copolymers of vinyl toluene and a (meth) acrylic acid ester or a saponified substance thereof, poly (meth)acrylic acid esters, (meth)acrylic acid ester copolymers of butyl (meth)acrylate and vinyl acetate, and polyamide resins such as vinyl acetate copolymer nylon, copolymerized nylon, N-alkoxymethylated nylon, and N-dimethylaminated nylon.

Meanwhile, the dried thickness of the thermoplastic resin layer is generally 2 µm to 30 µm, preferably 5 µm to 20 µm, and particularly preferably 7 µm to 16 µm.

(Interlayer)

In a case in which the transfer film has an interlayer, it is possible to prevent the mixing of components during the coating of a plurality of coated layers and during storage after coating.

As the interlayer, an oxygen insulation film having an oxygen insulation function, which is described in JP1993-72724A (JP-H05-72724A) as "separation layer", is preferably used. In this case, the sensitivity during exposure increases, the time load of steppers decreases, and the productivity improves.

The oxygen insulation film is preferably an oxygen insulation film which exhibits a low oxygen transmittance and disperses or dissolves in water or alkaline aqueous solutions and can be appropriately selected from well-known oxygen insulation films. A layer obtained by combining polyvinyl alcohol and polyvinylpyrrolidone is particularly preferred.

Meanwhile, the dried thickness of the interlayer is generally 0.2 µm to 5 µm, preferably 0.5 µm to 3 µm, and particularly preferably 1 µm to 2.5 µm.

The transfer film of the present disclosure is preferably further provided with a protective film (hereinafter, also referred to as the "protective peeling layer") or the like on the surface of the coloring composition layer. As the protective film, it is possible to appropriately use the protective film described in Paragraphs 0083 to 0087 and 0093 of JP2006-259138A.

<Method for Manufacturing Transfer Film>

The transfer film of the present disclosure can be produced according to the method for producing a curable transfer material described in Paragraphs 0094 to 0098 of JP2006-259138A. The transfer film of the present disclosure is preferably manufactured using the following method for manufacturing a transfer film.

The method for manufacturing a transfer film preferably includes a step of forming the coloring composition layer on the temporary support.

The method for manufacturing a transfer film preferably further includes a step of forming the thermoplastic resin layer before the formation of the coloring composition layer on the temporary support.

The method for manufacturing a transfer film preferably includes a step of forming the interlayer between the thermoplastic resin layer and the coloring composition layer after the step of forming the thermoplastic resin layer. Specifically, in the case of forming a transfer film having the interlayer, the transfer film can be preferably produced by applying and drying a solution in which additives are dissolved together with a thermoplastic organic polymer (a coating fluid for the thermoplastic resin layer) on the temporary support so as to provide a thermoplastic resin layer, then, applying and drying a preparation liquid prepared by adding resins or additives to a solvent that does not dissolve the thermoplastic resin layer (a coating fluid for the interlayer) on the thermoplastic resin layer so as to laminate the interlayer thereon, and further applying and drying a coating fluid for the coloring composition layer prepared using a solvent that does not dissolve the interlayer on this interlayer so as to laminate the coloring composition layer.

[Film Sensor]

The film sensor of the present disclosure is a film sensor including a transparent base sheet, an electrode pattern disposed on at least one surface (single surface or both surfaces) of the base sheet, a guidance wire connected to the electrode pattern, and an overcoat layer laminated so as to cover the electrode pattern, and the coloring composition layer which is a transferred layer transferred from the above-described transfer film of the present disclosure is disposed on at least one surface of the film sensor as a decorative layer. The decorative layer is preferably a layer formed by transferring the coloring composition layer using a method for manufacturing a film sensor of the present disclosure described below.

Meanwhile, "being transparent" in the base sheet refers to a property that the transmittance at 550 nm is 50% or more when the transmittance is measured using an ultraviolet and visible spectrophotometer such as UV-1800 (manufactured by Shimadzu Corporation) with an assumption that the air is blank.

<Constitution of Film Sensor>

FIG. 11A illustrates a schematic view of an example of the film sensor of the present disclosure.

The film sensor of the present disclosure having a constitution illustrated in FIG. 11A has transparent films 11 respectively disposed on both surfaces of a base sheet 1A.

The film sensor of the present disclosure having a constitution illustrated in FIG. 11A has an electrode pattern 4, a light-blocking conductive film 9, an overcoat layer 7, a guidance wire 6, and the decorative layer 45 disposed on a surface on which a front plate described below is laminated between the surfaces of the base sheet 1A.

The film sensor of the present disclosure having a constitution illustrated in FIG. 11A has an electrode pattern 3, a light-blocking conductive film 9, an overcoat layer 7, and a guidance wire 6 disposed on a surface opposite to the side on which the front plate described below is laminated between the surfaces of the base sheet 1A.

The film sensor has the decorative layer 45 (the decorative film of the film sensor) formed by transferring the coloring composition layer in the transfer film of the present disclosure.

Even in a case in which the coloring composition layer is laminated astride the guidance wire 6 and the overcoat layer 7 from the transfer film, the use of the transfer film of the present disclosure enables lamination causing no generation of bubbles in the mask portion boundary with a simple step without using an expensive facility such as a vacuum laminator.

The decorative layer is preferably a frame-like decorative layer. That is, in a case in which the film sensor of the present disclosure is used in an image display device including a front plate-integrated sensor of the present disclosure described below as a constituent element, an image display portion (electronic device display window) in the center preferably surrounds the decorative layer in a frame shape. Preferred aspects of the decorative layer in the film sensor of the present disclosure include the same aspect as that of the frame-like light-blocking layer described in JP5020580B.

Meanwhile, the preferred range of the thickness of the decorative layer 45 in the film sensor is the same as the range of the film thickness of the coloring composition layer in the transfer film of the present disclosure.

Figure 3:
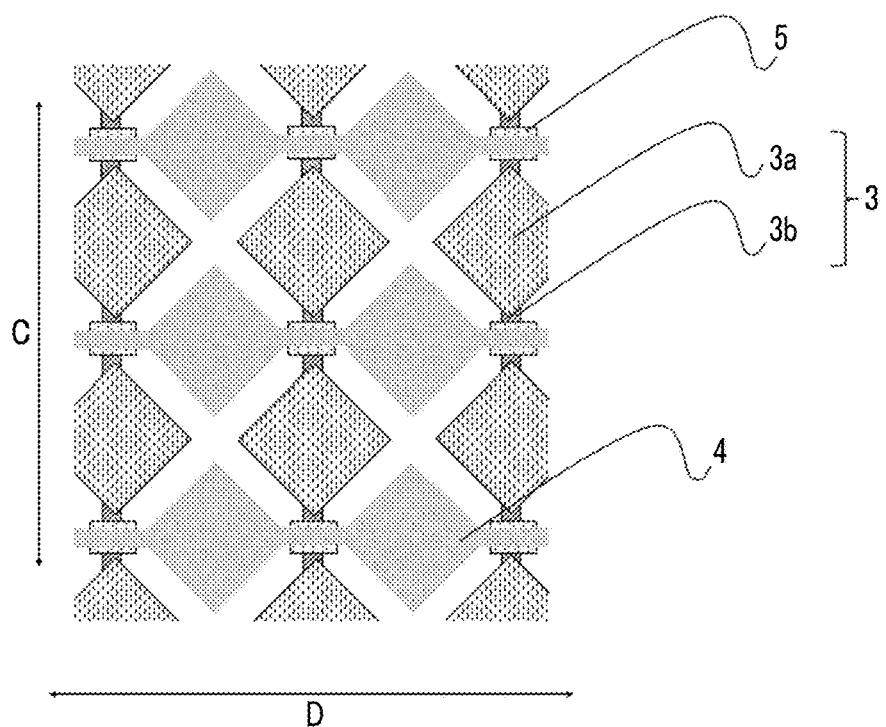
FIG. 3 is an explanatory view illustrating an example of an electrode pattern in the present disclosure.

In a case in which the film sensor of the present disclosure is used in the front plate-integrated sensor described below, there are cases in which the electrode pattern is provided as a first electrode pattern and a second electrode pattern respectively in two directions that are substantially orthogonal to each other such as a row direction and a column direction (refer to FIG. 3). For example, in the constitution of FIG. 3, the electrode pattern may be the second electrode pattern 4 or the first electrode pattern 3.

The first electrode pattern 3 and the second electrode pattern 4 will be described using FIG. 3. FIG. 3 is an explanatory view illustrating an example of the first electrode pattern and the second electrode pattern. As illustrated in FIG. 3, the first electrode pattern 3 is formed of pad portions 3a extending in a first direction C through a connection portion 3b. In addition, the second electrode pattern 4 is electrically insulated from the first electrode pattern 3 using an insulating layer 5 and is constituted of a plurality of pad portions formed so as to extend in a direction interesting the first direction (second direction D in FIG. 3). Here, in the case of forming the first electrode pattern 3, the pad portions 3a and the connection portion 3b may be integrally produced or only the connection portion 3b may be produced and then the pad portions 3a and the second electrode pattern 4 may be integrally produced (patterned). In the case of integrally producing (patterning) the pad portions 3a and the second electrode pattern 4, the respective layers are formed so that parts of the connection portion 3b and parts of the pad portions 3a are linked with one another and the first electrode pattern 3 and the second electrode pattern 4 are electrically insulated from each other using the insulating layer 5 as illustrated in FIG. 3. In FIG. 3, the insulating layer 5 is illustrated as discontinuous films for description; however, in the film sensor of the present disclosure, the base sheet 1A can be used as the insulating layer 5.

The film sensor of the present disclosure preferably includes a non-patterned region in which the electrode pattern is not formed. In the present specification, the non-patterned region refers to a region in which the electrode pattern 4 is not formed.

The base sheet 1A and the transparent films 11 are preferably adjacent to one another.

FIG. 11A illustrates an aspect in which the transparent films 11 are laminated on the base sheet 1A in adjacent thereto.

Here, within the scope of the gist of the present disclosure, a third transparent film may be laminated between the base sheet 1A and the transparent film. For example, the third transparent film having a refractive index of 1.5 to 1.52 (not illustrated in FIG. 11A) may be provided between the base sheet 1A and the transparent film 11.

In the film sensor, the transparent film and the electrode pattern are preferably adjacent to each other.

Figure 10:
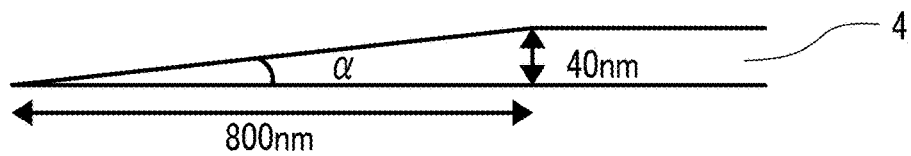
FIG. 10 is an explanatory view illustrating an example of a taper shape of an end portion of the electrode pattern.

An end portion of the electrode pattern 4 is not particularly limited in terms of the shape and may have a taper shape, and examples of the electrode pattern include an electrode pattern having a taper shape in an end portion as illustrated in FIG. 10.

Here, in a case in which the end portion of the electrode pattern has a taper shape, the angle of the end portion of the electrode pattern (hereinafter, also referred to as "taper angle") is preferably 30° or less, more preferably 0.1° to 15°, and particularly preferably 0.5° to 5°.

In the present specification, the taper angle can be obtained using a measurement method in which a microscopic photograph of the end portion of the electrode pattern is captured, the taper portion in the microscopic photograph is approximated to a triangle, and the taper angle is directly measured.

In a triangle obtained by approximating a taper portion in FIG. 10, the bottom surface is 800 nm, the height (the film thickness at the top portion substantially parallel to the bottom surface) is 40 nm, and the taper angle α in this case is approximately 3°. The bottom surface of the triangle obtained by approximating the taper portion is preferably 10 to 3,000 nm, more preferably 100 to 1,500 nm, and particularly preferably 300 to 1,000 nm.

Meanwhile, a preferred range of the height of the triangle obtained by approximating the taper portion is the same as the preferred range of the film thickness of the electrode pattern.

The guidance wire 6 is electrically connected to at least one of the first electrode pattern 3 and the second electrode pattern 4 and is preferably a separate element from the first electrode pattern 3 and the second electrode pattern 4.

FIG. 11A illustrates a view in which the guidance wire 6 is connected to the second electrode pattern 4 through the light-blocking conductive film 9. The guidance wire preferably has a frame shape. That is, in a case in which the film sensor of the present disclosure is used in an image display device including a front plate-integrated sensor of the present disclosure described below as a constituent element, the guidance wire preferably surrounds the image display portion in the center in a frame shape.

In the film sensor, the electrode pattern and the light-blocking conductive film are preferably adjacent to each other.

The light-blocking conductive film preferably has a frame shape. That is, in a case in which the film sensor of the present disclosure is used in an image display device including a front plate-integrated sensor of the present disclosure described below as a constituent element, the light-blocking conductive film preferably surrounds the image display portion in the center in a frame shape.

In addition, in FIG. 11A, the overcoat layer 7 is installed so as to cover all of the respective constituent elements other than the guidance wire. The overcoat layer 7 may be constituted so as to cover only a part of the respective constituent elements.

In the film sensor, both of the electrode pattern and the non-patterned region in which the electrode pattern is not formed are preferably continuously coated with the transparent film and the overcoat layer directly or through other layers.

Here, "being continuously coated" means that the transparent film and the overcoat layer are not patterned films but continuous films. That is, the transparent film and the overcoat layer preferably have no opening portions since the electrode pattern is made to be rarely visible.

In addition, the electrode pattern and the non-patterned region are more preferably directly coated with the transparent film and the overcoat layer than coated through other layers. Examples of "other layers" in a case in which the electrode pattern and the non-patterned region are coated through other layers include the light-blocking conductive film in a case in which the film sensor includes the light-blocking conductive film and the like.

<Material of Film Sensor>

Hereinafter, the material of the film sensor will be described.

(Decorative Layer)

The material of the decorative layer 45 formed by transferring the coloring composition layer in the transfer film of the present disclosure is the same as the material of the coloring composition layer in the transfer film of the present disclosure.

(Base Sheet)

As the base sheet, a base sheet causing no optical distortion and a base sheet having high transparency is more preferably used, specific examples of materials include polyethylene terephthalate (PET), polyethylene naphthalate, polycarbonate (PC), triacetyl cellulose (TAC), or a cycloolefin polymer (COP).

(Transparent Film)

The transparent film is preferably a transparent film having a refractive index of 1.6 to 1.78 and a film thickness of 55 to 110 nm from the viewpoint of further improving the visibility of the electrode pattern.

The refractive index of the transparent film is preferably 1.6 to 1.78 and more preferably 1.65 to 1.74. Here, the transparent film may have a monolayer structure or a laminate structure of two or more layers. In a case in which the transparent film has a laminate structure of two or more layers, the refractive index of the transparent film refers to the refractive index of all the layers.

"Being transparent" in the transparent film refers to the fact that the transmittance of the film at 550 nm is 50% or more when the transmittance is measured using an ultraviolet and visible spectrophotometer such as UV-1800 (manufactured by Shimadzu Corporation) with an assumption that the air is blank.

The material of the transparent film is not particularly limited as long as the above-described range of the refractive index is satisfied.

The thickness of the transparent film is preferably 55 to 110 nm, more preferably 60 to 110 nm, and particularly preferably 70 to 90 nm.

In a case in which the transparent film has a laminate structure of two or more layers, the film thickness of the transparent film refers to the total film thickness of all of the layers.

(Electrode Pattern)

The film sensor of the present disclosure has the electrode pattern disposed on at least one surface (single surface or both surfaces) of the base sheet.

In the film sensor of the present disclosure, the first electrode pattern may or may not be a transparent electrode pattern, but is preferably a transparent electrode pattern.

In the film sensor of the present disclosure, the second electrode pattern may or may not be a transparent electrode pattern, but is preferably a transparent electrode pattern.

The refractive index of the electrode pattern is preferably 1.75 to 2.1.

The material of the electrode pattern is not particularly limited, and it is possible to use well-known materials. For example, the electrode pattern can be produced using a translucent conductive metallic film such as indium tin oxide (ITO) or indium zinc oxide (IZO). Examples of the metallic film include ITO films; metallic films of Al, Zn, Cu, Fe, Ni, Cr, Mo, and the like; metal oxide films of $SiO_2$ and the like; and the like. At this time, the film thicknesses of the respective elements can be set to 10 to 200 nm. In addition, since firing turns amorphous ITO films into crystalline ITO films, it is also possible to reduce the electrical resistance. In addition, the first electrode pattern 3, the second electrode pattern 4, and the guidance wire 6 described below can also be manufactured using a photosensitive film having a photocurable resin layer for which a conductive fiber is used. Additionally, in a case in which the first electrode pattern and the like are formed using ITO or the like, it is possible to refer to Paragraphs 0014 to 0016 of JP4506785B. Among these, the electrode pattern is preferably an ITO film.

(Guidance Wire)

The film sensor of the present disclosure has the guidance wire. The guidance wire is preferably a guidance wire of the electrode pattern and is a separate conductive element from the electrode pattern. The guidance wire may be a separate conductive element from the light-blocking conductive film described below or the guidance wire may be the same member as the light-blocking conductive film described below.

The material of the guidance wire is not particularly limited, and it is possible to use well-known materials. In the related art, MAM having a three-layer structure of Mo/Al/Mo has been generally used as the material of the guidance wire due to high conductivity and ease of fine processing, but it is possible to use the same material as the above-described material of the electrode pattern, and furthermore, it is also possible to use metals such as gold (Au), silver (Ag), copper (Cu), aluminum (Al), molybdenum (Mo), palladium (Pd), platinum (Pt), carbon (C), and iron (Fe). In a case in which conductive paste or conductive ink containing the above-described metals is formed using a wet method, it is possible to obtain the guidance wire with a process than costs less than deposition methods. The material of the guidance wire is preferably metal and more preferably copper or aluminum.

(Light-Blocking Conductive Film)

The light-blocking conductive film 9 may be a single metallic film or a film made of an alloy, a metallic compound, or the like which has a high conductivity and a favorable light-blocking property. The light-blocking conductive film can be formed using a vacuum deposition method, a sputtering method, an ion plating method, a plating method, or the like. In addition, the light-blocking conductive film 9 is preferably formed of a material that does not etch the electrode pattern but etches the light-blocking conductive film 9. That is, the material of the light-blocking conductive film 9 is preferably selected from materials in which an etchant that does not etch the electrode pattern but etches the light-blocking conductive film 9 is present.

Examples of preferred metals include aluminum, nickel, copper, silver, tin, and the like. Particularly, a 20 nm to 1,000 nm-thick metallic film made of a copper foil is extremely preferred since the conductivity and the light-blocking property are excellent, and the film can be easily etched using a hydrogen peroxide solution in an acidic atmosphere in which the electrode pattern is not etched. The thickness of the light-blocking conductive film 9 is more preferably 30 nm or more. The thickness of the light-blocking conductive film 9 is still more preferably 100 nm to 500 nm. In a case in which the thickness is set to 100 nm or more, a highly conductive light-blocking conductive film 9 can be obtained, and, in a case in which the thickness is set to 500 nm or less, a light-blocking conductive film 9 that can be easily handled and has excellent workability can be obtained.

In the transfer film of the present disclosure, the decorative layer has a role of hiding the light-blocking conductive film 9 as described above.

(Overcoat Layer)

The film sensor is preferably produced by transferring the overcoat layer onto the electrode pattern.

The electrode pattern and the guidance wire which are flexible wires produced on the film sensor can be directly connected to a terminal portion (not illustrated) of the guidance wire, and thus it becomes possible to send signals of the film sensor to electrical circuits.

The overcoat layer may be photocurable or thermocurable and photocurable. Between these, the overcoat layer is preferably a thermosetting transparent resin layer and a photocurable transparent resin layer since the overcoat is easily formed by being photocured after transfer and the overcoat layer is thermally cured after being formed, whereby the reliability of the film can be imparted.

The thickness of the overcoat layer is preferably 1 μm or more, more preferably 5 μm to 16 μm from the viewpoint of sufficiently exhibiting a surface protection function, particularly preferably 5 μm to 13 μm, and more particularly preferably 5 μm to 10 μm.

The melt viscosity ηc of the overcoat layer measured at 100° C. is preferably $1.0 \times 10^3$ Pa·s or more, still more preferably $1.0 \times 10^3$ Pa·s to $1.0 \times 10^6$ Pa·s, more preferably $3.0 \times 10^3$ Pa·s to $1.0 \times 10^6$ Pa·s, and particularly preferably $4.0 \times 10^3$ Pa·s to $1.0 \times 10^5$ Pa·s.

The refractive index of the overcoat layer is preferably 1.50 to 1.53, more preferably 1.50 to 1.52, and particularly preferably 1.51 to 1.52.

The overcoat layer preferably includes a binder polymer, a polymerizable compound, and a polymerization initiator.

The overcoat layer is preferably a transparent resin layer. A method for controlling the refractive index of the overcoat layer is not particularly limited, but it is possible to singly use an overcoat layer having a desired refractive index, use an overcoat layer to which particles such as metal particles or metal oxide particles are added, or use a composite of a metallic salt and a polymer.

Furthermore, in the overcoat layer, additives may be used. Examples of the additives include the surfactants described in Paragraph 0017 of JP4502784B and Paragraphs 0060 to 0071 of JP2009-237362A, the thermopolymerization inhibitors described in Paragraph 0018 of JP4502784B, and other additives described in Paragraphs 0058 to 0071 of JP2000-310706A.

—Binder Polymer—

As the binder polymer that is preferably included in the overcoat layer, it is possible to use any polymer components without any particular limitations, polymer components having high surface hardness and high heat resistance are preferred, alkali-soluble resins are more preferred, and, among alkali-soluble resins, well-known curable siloxane resin materials, acrylic resin materials, and the like are preferably used. The binder polymer that is included in an organic solvent-based resin composition that is used to form the overcoat layer preferably contains an acrylic resin. A preferred range of the binder polymer in the overcoat layer will be specifically described.

The resin (referred to as a binder or a polymer) which is used in the overcoat layer and is soluble in organic solvents is not particularly limited within the scope of the gist of the present disclosure, can be selected from well-known resins, is preferably an alkali-soluble resin, and, as the alkali-soluble resin, it is possible to use the polymers described in Paragraph 0025 of JP2011-95716A and Paragraphs 0033 to 0052 of JP2010-237589A.

In addition, the overcoat layer may also include polymer latex. The polymer latex mentioned herein refers to latex obtained by dispersing water-insoluble polymer particles in water. The polymer latex is described in, for example, "Chemistry of polymer latex (published by Kobunshi Kankokai (1973))" by Muroi Soichi.

The polymer particles are preferably polymer particles of a polymer selected from an acrylic polymer, a vinyl acetate-based polymer, a rubber-based (for example, styrene-butadiene-based or chloroprene-based) polymer, an olefin-based polymer, a polyester-based polymer, a polyurethane-based polymer, or a polystyrene-based polymer or a copolymer thereof.

It is preferable to strengthen the mutual bonding force between polymer chains that constitute the polymer particles. Examples of means for strengthening the mutual bonding force between polymer chains include a method in which an interaction by a hydrogen bond is used and a method in which a covalent bond is used. Means for imparting a hydrogen bonding force is preferably the introduction of a monomer having a polar group into a polymer chain by means of copolymerization or graft polymerization. Examples of the polar group include carboxyl groups (included in acrylic acid, methacrylic acid, itaconic acid, fumaric acid, maleic acid, crotonic acid, partially-esterified maleic acid, and the like), primary, secondary, and tertiary amino groups, ammonium salt groups, sulfonic acid groups (styrene sulfonate), and the like, and carboxyl groups and sulfonic acid groups are particularly preferred.

A preferred range of the copolymerization ratio of the monomer having the polar group is 5% to 35% by mass, more preferably 5% to 20% by mass, and still more preferably 15% to 20% by mass with respect to 100% by mass of the polymer. Meanwhile, examples of means for generating a covalent bond include methods in which an epoxy compound, a blocked isocyanate, an isocyanate, a vinylsulfone compound, an aldehyde compound, a methylol compound, a carboxylic acid anhydride, or the like is reacted with a hydroxyl group, a carboxyl group, a primary or secondary amino group, an acetoacetyl group, a sulfonic acid, or the like.

Among polymers used in these reactions, a polyurethane derivative obtained from a reaction between a polyol and a polyisocyanate compound is preferred, a polymer that is jointly used with a polyhydric amine as a chain extender is more preferred, and a polymer turned into an ionomer type by further introducing the polar group into the polymer chain is particularly preferred.

The mass-average molecular weight of the polymer is preferably 10,000 or more and more preferably 20,000 to 100,000. Examples of a polymer preferred in the present disclosure include ethylene ionomers and polyurethane ionomers which are copolymers of ethylene and methacrylic acid.

The polymer latex that can be used in the present invention may be polymer latex obtained by emulsification polymerization or polymer latex obtained by emulsification. Methods for preparing the polymer latex are described in, for example, "Emulsion Latex Handbook" (edited by the emulsion latex handbook editorial committee, published by Taiseisha Ltd. (1975)).

Examples of the polymer latex that can be used in the present disclosure include polymer latex obtained by the ammonia neutralization and emulsification of an aqueous dispersion of a polyethylene ionomer (trade name: CHEMIPEARL (registered trademark) S120 manufactured by Mitsui Chemicals, Inc., solid content: 27% by mass), CHEMIPEARL (registered trademark) S100 manufactured by Mitsui Chemicals, Inc., solid content: 27% by mass), CHEMIPEARL (registered trademark) S111 manufactured by Mitsui Chemicals, Inc., solid content: 27% by mass), CHEMIPEARL (registered trademark) S200 manufactured by Mitsui Chemicals, Inc., solid content: 27% by mass), CHEMIPEARL (registered trademark) S300 manufactured by Mitsui Chemicals, Inc., solid content: 35% by mass), CHEMIPEARL (registered trademark) S650 manufactured by Mitsui Chemicals, Inc., solid content: 27% by mass), CHEMIPEARL (registered trademark) S75N manufactured by Mitsui Chemicals, Inc., solid content: 24% by mass), an aqueous dispersion of a polyether-based polyurethane (trade name: HYDRAN WLS-201 manufactured by DIC Corporation, solid content: 35% by mass, Tg: −50° C.) (trade name: HYDRAN WLS-202 manufactured by DIC Corporation, solid content: 35% by mass, Tg: −50° C.) (trade name: HYDRAN WLS-221 manufactured by DIC Corporation, solid content: 35% by mass, Tg: −30° C.) (trade name: HYDRAN WLS-210 manufactured by DIC Corporation, solid content: 35% by mass, Tg: −15° C.) (trade name: HYDRAN WLS-213 manufactured by DIC Corporation, solid content: 35% by mass, Tg: −15° C.) (trade name: HYDRAN WLI-602 manufactured by DIC Corporation, solid content: 39.5% by mass, Tg: −50° C.) (trade name: HYDRAN WLI-611 manufactured by DIC Corporation, solid content: 39.5% by mass, Tg: −15° C.), an ammonium alkyl acrylate copolymer (trade name: JURYMER (registered trademark) AT-210 manufactured by Nippon Pure Chemical Industries, Ltd.), an ammonium alkyl acrylate copolymer (trade name: JURYMER (registered trademark) AT-410 manufactured by Nippon Pure Chemical Industries, Ltd.), an ammonium alkyl acrylate copolymer (trade name: JURYMER (registered trademark) AT-510 manufactured by Nippon Pure Chemical Industries, Ltd.), or a polyacrylic acid (trade name: JURYMER (registered trademark) AC-10L manufactured by Nippon Pure Chemical Industries, Ltd.).

—Polymerizable Compound—

The overcoat layer preferably includes a polymerizable compound. The polymerizable compound may be a photopolymerizable compound or a thermopolymerizable compound.

The overcoat layer preferably has a photopolymerizable compound. A photopolymerizable group in the photopolymerizable compound is not particularly limited, and examples thereof include ethylenic unsaturated groups, epoxy groups, and the like. As the photopolymerizable compound in the overcoat layer, the overcoat layer preferably includes a compound having an ethylenic unsaturated group and more preferably includes a compound having a (meth)acryloyl group.

Only one kind of the photopolymerizable compound may be used singly or two or more kinds of the photopolymerizable compounds may be used in combination, and two or more kinds of the photopolymerizable compounds are preferably used in combination from the viewpoint of improving the heat and moisture resistance after the supply of saline water after the exposure of the transferred overcoat layer. As the photopolymerizable compound, a tri- or higher-functional photopolymerizable compound and a difunctional photopolymerizable compound are preferably used in combination from the viewpoint of improving the heat and moisture resistance after the supply of saline water after the exposure of the transferred overcoat layer.

The amount of the difunctional photopolymerizable compound used is preferably in a range of 10% by mass to 90% by mass, more preferably in a range of 20% by mass to 85% by mass, and particularly preferably in a range of 30% by mass to 80% by mass of all of the photopolymerizable compounds.

The amount of the tri- or higher-functional photopolymerizable compound used is preferably in a range of 10% by mass to 90% by mass, more preferably in a range of 15% by mass to 80% by mass, and particularly preferably in a range of 20% by mass to 70% by mass of all of the photopolymerizable compounds.

As the photopolymerizable compound, the overcoat layer preferably includes at least a compound having two ethylenic unsaturated groups and a compound having at least three ethylenic unsaturated groups and more preferably includes at least a compound having two (meth)acryloyl groups and a compound having at least three (meth)acryloyl groups.

In addition, as the photopolymerizable compound, the overcoat layer preferably includes a urethane (meth)acrylate compound. The amount of the urethane (meth)acrylate compound mixed is preferably 10% by mass or more and more preferably 20% by mass or more of all of the photopolymerizable compounds. In the urethane (meth)acrylate compound, the number of functional groups in the photopolymerizable group, that is, the number of (meth)acryloyl groups is preferably three or more and more preferably four or more.

The photopolymerizable compound having a difunctional ethylenic unsaturated group is not particularly limited as long as the compound has two ethylenic unsaturated groups in the molecule, and commercially available (meth)acrylate compounds can be used. For example, it is possible to preferably use tricyclodecane dimethanol diacrylate (A-DCP, manufactured by Shin-Nakamura Chemical Co., Ltd.), tricyclodecane dimethanol dimethacrylate (DCP, manufactured by Shin-Nakamura Chemical Co., Ltd.), 1,9-nonanediol diacrylate (A-NOD-N, manufactured by Shin-Nakamura Chemical Co., Ltd.), 1,6-hexanediol diacrylate (A-HD-N, manufactured by Shin-Nakamura Chemical Co., Ltd.), and the like.

The photopolymerizable compound having a tri- or higher-functional ethylenic unsaturated group is not particularly limited as long as the compound has three or more ethylenic unsaturated groups in the molecule, and, for example, it is possible to use (meth)acrylate compounds having a skeleton such as dipentaerythritol (triketra/penta/hexa)acrylates, pentaerythritol (tri/tetra)acrylates, trimethylolpropane triacrylate, ditrimethylolpropane tetraacrylate, and isocyanurate acrylate, and (meth)acrylate compounds having a long span length between (meth)acrylic acids are preferred. Specifically, it is possible to preferably use the caprolactone-modified compounds (KAYARAD DPCA manufactured by Nippon Kayaku Co., Ltd., A-9300-1CL manufactured by Shin-Nakamura Chemical Co., Ltd., and the like) and the alkylene oxide-modified compounds (KAYARAD RP-1040 manufactured by Nippon Kayaku Co., Ltd., ATM-35E and A-9300 manufactured by Shin-Nakamura Chemical Co., Ltd., EBECRYL 135 manufactured by Daicel-Allnex Ltd., and the like) of the above-described (meth) acrylate compounds having a skeleton such as dipentaerythritol (tri/tetra/penta/hexa)acrylates, pentaerythritol (tri/tetra) acrylates, trimethylolpropane triacrylate, ditrimethylolpropane tetraacrylate, and isocyanurate acrylate. In addition, it is possible to preferably use carboxyl group-containing polybasic acid-modified (meth)acrylate monomers (ARONIX M-510, M-520, and the like manufactured by Toagosei Company, Limited). In addition, it is preferable to use tri- or higher-functional urethane (meth)acrylates. As the tri- or higher-functional urethane (meth)acrylates, it is possible to preferably use 8UX-015A (manufactured by Taisei Fine Chemical Co., Ltd.), UA-32P (manufactured by Shin-Nakamura Chemical Co., Ltd.), UA-1100H (manufactured by Shin-Nakamura Chemical Co., Ltd.,), and the like.

The average molecular weight of the photopolymerizable compound is preferably 200 to 3,000, more preferably 250 to 2,600, and particularly preferably 280 to 2,200.

As the thermopolymerizable compound, it is possible to preferably use the above-described photopolymerizable compounds that are also thermopolymerizable compounds.

In the overcoat layer, the ratio of the polymerizable compound to the binder polymer (the content M of the polymerizable compound/the content B of the binder polymer) is preferably 0.1 to 2 times, more preferably 0.2 to 1.5 times, and particularly preferably 0.3 to 1 time.

—Polymerization Initiator—

The overcoat layer preferably includes a polymerization initiator. The polymerization initiator may be a photopolymerization initiator or a thermopolymerization initiator.

The overcoat layer preferably has a photopolymerization initiator. In a case in which the curable transparent resin layer includes the photopolymerizable compound and the photopolymerization initiator, it is possible to facilitate the formation of patterns of the curable transparent resin layer.

As the photopolymerization initiator that is used in organic solvent-based resin compositions, it is possible to use the photopolymerization initiators described in Paragraphs 0031 to 0042 of JP2011-95716A.

As the thermopolymerization initiator, it is possible to preferably use the thermopolymerization initiators described in Paragraphs 0193 to 0195 of JP2011-32186A, the content of which is incorporated into the present specification.

In the overcoat layer, the content of the polymerization initiator is preferably 1% by mass or more and more preferably 2% by mass or more of the overcoat layer. In the overcoat layer, the content of the polymerization initiator is preferably 10% by mass or less and more preferably 5% by mass or less of the overcoat layer from the viewpoint of improving the patterning property and substrate adhesiveness.

—Metal Oxide Particles—

The overcoat layer may or may not include particles (preferably metal oxide particles) for the purpose of adjusting the refractive index or the light transmittance. In order to control the refractive index of the overcoat layer in the above-described range, it is possible to add metal oxide particles to the overcoat layer in any ratio depending on the kind of the polymer or the polymerizable compound being used. In the overcoat layer, the content of the metal oxide particles is preferably 0% to 35% by mass, more preferably 0% to 10% by mass, and particularly preferably 0% by mass of the overcoat layer.

Since the metal oxide particles are highly transparent and light-transmissible, it is possible to obtain positive-type curable resin compositions having a high refractive index and excellent transparency.

The metal oxide particles preferably have a refractive index higher than the refractive index of a composition made of a material obtained by excluding these particles from the overcoat layer.

Meanwhile, the metal of the above-described metal oxide particles is also a semi-metal such as B, Si, Ge, As, Sb, or Te.

The metal oxide particles which are light-transmissible and have a high refractive index are preferably oxide particles including atoms such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, and Te, more preferably titanium oxide, titanium complex oxide, zinc oxide, zirconium oxide, indium/tin oxide, or antimony/tin oxide, still more preferably titanium oxide, titanium complex oxide, or zirconium oxide, particularly preferably titanium oxide or zirconium oxide, and most preferably titanium dioxide. Titanium dioxide is particularly preferably rutile-type titanium oxide having a high refractive index. The surfaces of these metal oxide particles can also be treated with an organic material in order to impart dispersion stability.

From the viewpoint of the transparency of the overcoat layer, the average primary particle diameter of the metal oxide particles is preferably 1 to 200 nm and particularly preferably 3 to 80 nm. Here, the average primary particle diameter of particles refers to the arithmetic average obtained by measuring the particle diameters of any 200 particles using an electronic microscope. In addition, in a case in which the shapes of particles are not spherical, the longest sides are considered as the diameters.

In addition, one kind of the metal oxide particles may be used singly or two or more kinds of the metal oxide particles can be jointly used.

The overcoat layer preferably has at least one of $ZrO_2$ particles, $Nb_2O_5$ particles, or $TiO_2$ particles from the viewpoint of controlling the refractive index in the range of the refractive index of the overcoat layer and more preferably has $ZrO_2$ particles or $Nb_2O_5$ particles.

[Method for Manufacturing Film Sensor]

A method for manufacturing a film sensor of the present disclosure includes a step of forming a decorative layer by transferring the coloring composition layer from the transfer film of the present disclosure to at least one surface of a film sensor including a transparent base sheet, an electrode pattern disposed on at least one surface (single surface or both surfaces) of the base sheet, a guidance wire connected to the electrode pattern, and an overcoat layer laminated so as to cover the electrode pattern.

<Formation of Transparent Film>

In a case in which the film sensor of the present disclosure further has a transparent film having a refractive index of 1.6 to 1.78 and a film thickness of 55 to 110 nm, the transparent film is formed on the transparent base sheet directly or through other layers.

A method for forming the transparent film is not particularly limited, but a method for forming the transparent film by coating, transferring, or sputtering is preferred.

In a case in which the transparent film is an inorganic film, the transparent film is preferably formed by means of sputtering. That is, in the laminate, the transparent film is also preferably formed by means of sputtering.

As the method for sputtering, it is possible to preferably use the method used in JP2010-86684A, JP2010-152809A, and JP2010-257492A.

Meanwhile, in the present specification, "being transparent" means that the transmittance of light at a wavelength of 400 nn ti 750 nm is 80% or more.

<Formation of Electrode Pattern, Light-Blocking Conductive Film, and Guidance Wire>

The electrode pattern, the light-blocking conductive film, and the guidance wire can be formed on the film base material using a photosensitive film.

At least one element of the first electrode pattern 3, the second electrode pattern 4, and the guidance wire 6 is preferably formed using a photosensitive film having a temporary support and a photocurable resin layer in this order. In the case of forming the respective elements using the photosensitive film, it is possible to manufacture front plate-integrated sensors having a reduced thickness and a reduced weight with a simple step.

In addition, the electrode pattern and the light-blocking conductive film are also preferably formed using the method described in Paragraphs 0030 to 0042 of JP5026580B.

(Photosensitive Film)

The photosensitive film other than the transfer film of the present disclosure which is preferably used in the case of manufacturing the film sensor or the front plate-integrated sensor of the present disclosure will be described. The photosensitive film has a temporary support and a photocurable resin layer and preferably has a thermoplastic resin layer between the temporary support and the photocurable resin layer. In a case in which the electrode pattern, the light-blocking conductive film, the guidance wire or a second decorative layer, and the like are formed using the photosensitive film having the thermoplastic resin layer, air bubbles are not easily generated in elements formed by transferring the photocurable resin layer, image unevenness or the like is not easily caused in image display devices, and excellent display characteristics can be obtained.

The photosensitive film may be a negative-type material or a positive-type material.

—Layers Other than Photocurable Resin Layer and Production Method—

As the temporary support and the thermoplastic resin layer in the photosensitive film, it is possible to use the thermoplastic resin layer described in Paragraphs 0041 to 0047 of JP2014-108541A. In addition, as the method for producing the photosensitive film, it is possible to use the same method as the manufacturing method described in Paragraphs 0041 to 0047 of JP2014-108541A.

—Photocurable Resin Layer—

In the photosensitive film, additives are added to the photocurable resin layer depending on the applications. That is, in a case in which the photosensitive film is used to form the second decorative layer, a colorant is added to the photocurable resin layer. In addition, in a case in which the photosensitive film has a conductive photocurable resin layer in order to form the electrode pattern, the light-blocking conductive film, and the guidance wire, a conductive fiber and the like are added to the photocurable resin layer.

In a case in which the photosensitive film is a negative-type material, the photocurable resin layer preferably includes an alkali-soluble resin, a polymerizable compound, or a polymerization initiator. Furthermore, conductive fibers, colorants, other additives, and the like are used, but the components are not limited thereto.

—Alkali-Soluble Resin, Polymerizable Compound, Polymerization Initiator—

As the alkali-soluble resin, the polymerizable compound, or the polymerization initiator included in the photosensitive film, it is possible to use the same alkali-soluble resin, polymerizable compound, or polymerization initiator as those used in the transfer film of the present disclosure.

—Conductive Fiber (in Case of being Used as Conductive Photocurable Resin Layer)—

In a case in which the photosensitive film on which the conductive photocurable resin layer is laminated is used to form the electrode pattern or the guidance wire, it is possible to use the following conductive fibers and the like in the photocurable resin layer.

The structure of the conductive fiber is not particularly limited and can be appropriately selected depending on the purposes, but is preferably any one of a solid structure and a hollow structure.

Here, there are cases in which a fiber having a solid structure will be referred to as a "wire" and a fiber having a hollow structure will be referred to as a "tube". In addition, there are cases in which a conductive fiber having an average short-axis length of 1 nm to 1,000 nm and an average long-axis length of 1 μm to 100 μm will be referred to as a "nanowire".

In addition, there are cases in which a conductive fiber having an average short-axis length of 1 nm to 1,000 nm, an average long-axis length of 0.1 μm to 1,000 μm, and a hollow structure will be referred to as a "nanotube".

The material of the conductive fiber is not particularly limited as long as the material is conductive and can be appropriately selected depending on the purposes, but at least one of metal or carbon is preferred, and, among these, the conductive fiber is particularly preferably at least one of metal nanowires, metal nanotubes, or carbon nanotubes.

The material of the metal nanowire is not particularly limited, and, for example, at least one metal selected from the group consisting of Groups 4, 5, and 6 of the extended periodic table (IUPAC 1991) is preferred, at least one metal selected from Groups 2 to 14 is more preferred, at least one metal selected from Groups 2, 8, 9, 10, 11, 12, 13, and 14 is still more preferred, and materials including the above-described metal as a main component are particularly preferred.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, alloys thereof, and the like. Among these, metals mainly containing silver or metals containing an alloy of silver and a metal other than silver are preferred from the viewpoint of the excellent conductivity.

The "metals mainly containing silver" means that the content of silver in the metal nanowire is 50% by mass or more and preferably 90% by mass or more.

Examples of metals used to form the alloys with silver include platinum, osmium, palladium, iridium, and the like. These metals may be used singly or two or more metals may be jointly used.

The shape of the metal nanowire is not particularly limited and can be appropriately selected depending on the purposes, and the metal nanowire may have, for example, any shape such as a cylindrical shape, a cubic shape, or a column shape having a polygonal cross-section; however, in applications in which high transparency is required, a cylindrical shape or a cross-sectional shape in which the corners of the polygonal shape of the cross-section are rounded is preferred.

The cross-sectional shape of the metal nanowire can be investigated by applying a water dispersion liquid of the metal nanowire onto the base material and observing the cross-section using a transmission electron microscope (TEM).

Figure 9:
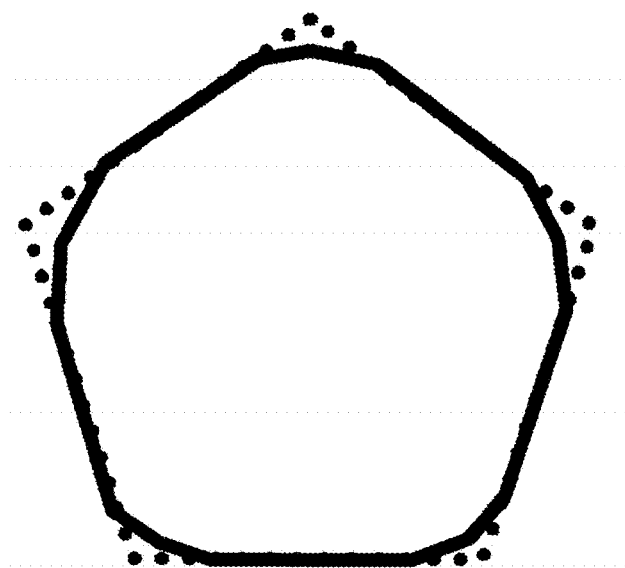
FIG. 9 is an explanatory view illustrating a cross section of a metal nanowire.

The corner of the cross-section of the metal nanowire refers to a peripheral portion of a point at which a line extended from a side of the cross-section and a perpendicular line drawn from an adjacent side intersect each other. In addition, "a side of the cross-section" refers to a straight line connecting adjacent corners. In this case, the ratio of the "outer circumferential length of the cross-section" to the total length of "the respective sides of the cross-section" is considered as the degree of sharpness. For example, in the cross-section of a metal nanowire as illustrated in FIG. 9, the degree of sharpness can be represented by the ratio of the outer circumferential length of the cross-section indicated using a solid line to the outer circumferential length of a pentagon indicated using a dotted line. A cross-sectional shape having a degree of sharpness of 75% or less is defined as a cross-sectional shape with round corners. The degree of sharpness is preferably 60% or less and more preferably 50% or less. In a case in which the degree of sharpness exceeds 75%, electrons are locally present in the corners, and plasmon absorption increases, which may cause the remaining of a yellow tint and the consequent deterioration of the transparency. In addition, there are cases in which the linearity of edge portions of a pattern degrades and rattling is caused. The lower limit of the degree of sharpness is preferably 30% and more preferably 40%.

The average short-axis length (in some case, referred to as "average short-axis diameter" or "average diameter") of the metal nanowire is preferably 150 nm or less, more preferably 1 nm to 40 nm, still more preferably 10 nm to 40 nm, and particularly preferably 15 nm to 35 nm.

In a case in which the average short-axis length is less than 1 nm, oxidation resistance deteriorates, and there are cases in which durability deteriorates, and, in a case in which the average short-axis length exceeds 150 nm, the metal nanowire causes scattering, and there are cases in which sufficient transparency cannot be obtained.

The average short-axis length of the metal nanowire is obtained by observing 300 metal nanowires using a transmission electron microscope (TEM; manufactured by JEOL Ltd.; JEM-2000FX) and calculating the average short-axis length of the metal nanowire from the average value.

Meanwhile, in a case in which the cross-sectional shape of the metal nanowire is not round, the longest axis is considered as the short-axis length.

The average long-axis length (in some cases, referred to as "average length") of the metal nanowire is preferably 1 μm to 40 μm, more preferably 3 μm to 35 μm, and still more preferably 5 μm to 30 μm.

In a case in which the average long-axis length is shorter than 1 μm, it is difficult to form dense networks, and there are cases in which sufficient conductivity cannot be obtained. In a case in which the average long-axis length exceeds 40 μm, the metal nanowires are too long and are thus tangled during manufacturing, and there are cases in which aggregates are generated in the manufacturing process.

The average long-axis length of the metal nanowire is obtained by, for example, observing any 300 metal nanowires using a transmission electron microscope (TEM; manufactured by JEOL Ltd.; JEM-2000FX), obtaining the average value of the long axis lengths of the 300 metal nanowires, and considering the average value as the average long-axis length of the metal nanowire. Meanwhile, in a case in which the metal nanowire is bent, a circle including the metal nanowire as an arc is considered, and the value computed from the radius and curvature thereof is used as the long-axis length.

The layer thickness of the conductive photocurable resin layer is preferably 0.1 to 20 μm, more preferably 0.5 to 18 μm, and particularly preferably 1 to 15 μm from the viewpoint of the stability of coating fluids, drying during coating, and the development time during patterning.

The content of the conductive fiber in the total solid contents of the conductive photocurable resin layer is preferably 0.01% by mass to 50% by mass, more preferably 0.05% by mass to 30% by mass, and particularly preferably 0.1% by mass to 20% by mass from the viewpoint of the conductivity and the stability of coating fluids.

—Colorant (in Case of being Used as Second Decorative Layer)—

In a case in which the photosensitive film is used as the second decorative layer, it is possible to use a colorant in the photocurable resin layer. As the colorant that is used in the photocurable resin layer, it is possible to preferably use well-known colorants (organic pigments, inorganic pigments, dyes, and the like).

In a case in which the photocurable resin layer is used as a black second decorative layer, a black colorant is preferably included from the viewpoint of the optical density. Examples of the black colorant include carbon black, titanium carbon, iron oxide, titanium oxide, graphite, and the like, and, among these, carbon black is preferred. Furthermore, in the photocurable resin layer, in addition to black colorants, mixtures of red pigments, blue pigments, green pigments, and the like can be used.

In a case in which the photocurable resin layer is used as a white second decorative layer, it is possible to use the white pigments described in Paragraphs 0015 and 0114 of JP2005-7765A. In order to use the photocurable resin layer as second decorative layers having other colors, the pigments or dyes described in Paragraphs 0183 to 0185 of JP4546276B may be mixed into the photocurable resin layer. Specifically, it is possible to preferably use the pigments and dyes described in Paragraphs 0038 to 0054 of JP2005-17716A, the pigments described in Paragraphs 0068 to 0072 of JP2004-361447A, the colorants described in Paragraphs 0080 to 0088 of JP2005-17521A, and the like.

The colorant (preferably a pigment and more preferably carbon black) is desirably used as a dispersion liquid. This dispersion liquid can be prepared by adding a composition obtained by mixing the colorant and a pigment dispersant in advance to an organic solvent described below (or a vehicle) and dispersing the composition in the organic solvent. The vehicle refers to a portion of a medium in which a pigment is dispersed when paint is in a liquid state and includes a liquid component (a binder) which is a liquid phase and bonded with the pigment so as to form coated films and a component that dissolves and dilutes the above-described component (an organic solvent).

The disperser used in the case of dispersing the pigment is not particularly limited, and examples thereof include well-known dispersers such as kneaders, roll mills, attritors, super mills, dissolvers, homogenizers, sand mills, and beads mills which are described in Section. 438 of "Pigment Dictionary", Kunizou Asakura, 1$^{st}$ edition, Asakura Publishing Co., Ltd., 2000.

Furthermore, the pigment may be finely ground using a friction force by means of the mechanical grinding described in p. 310 of the same publication.

The colorant is preferably a colorant having a number-average particle diameter of 0.001 μm to 0.1 μm and more preferably a colorant of 0.01 μm to 0.08 μm from the viewpoint of the dispersion stability. The "particle diameter" mentioned herein refers to the diameter of a circle having the same area as the particle in an electron micrograph image, and the "number-average particle diameter" refers to the average value of 100 particle diameters randomly selected from the particle diameters of a number of particles.

The layer thickness of the photocurable resin layer including the colorant is preferably 0.5 to 10 μm, more preferably 0.8 to 5 μm, and particularly preferably 1 to 3 μm from the viewpoint of the difference in thickness from other layers. The content ratio of the colorant in the solid content of the coloring composition is not particularly limited, but is preferably 15% by mass to 70% by mass, more preferably 20% by mass to 60% by mass, and still more preferably 25% by mass to 50% by mass from the viewpoint of sufficiently shortening the development time.

The total solid content mentioned in the present specification refers to the total mass of nonvolatile components excluding the solvent and the like from the coloring composition.

Meanwhile, in a case in which the insulating layer is formed using the photosensitive film, the layer thickness of the photocurable resin layer is preferably 0.1 to 5 µm, more preferably 0.3 to 3 µm, and particularly preferably 0.5 to 2 µm from the viewpoint of maintaining the insulating property.

—Other Additives—

Furthermore, in the photocurable resin layer, other additives may be used. As the additives, it is possible to use the same additives as those used in the transfer film of the present disclosure.

In addition, as the solvent used in the case of manufacturing the photosensitive film by means of coating, it is possible to use the same solvent as that used in the transfer film of the present disclosure.

Hitherto, a case in which the photosensitive film is a negative-type material has been mainly described, but the photosensitive film may be a positive-type material. In a case in which the photosensitive film is a positive-type material, for example, the material and the like described in JP2005-221726A are used in the photocurable resin layer, but the components are not limited thereto.

(Formation of First and Second Electrode Patterns and Guidance Wire Using Photosensitive Film)

The first electrode pattern 3, the second electrode pattern 4, and the guidance wire 6 can be formed by an etching treatment, using the photosensitive film having the conductive photocurable resin layer, or using the photosensitive film as a liftoff material.

—Etching Treatment—

In a case in which the first electrode pattern 3, the second electrode pattern 4, and the guidance wire 6 are formed by an etching treatment, first, a transparent electrode layer such as ITO is formed on the second decorative layer 2-formed side (noncontact surface) of the front plate 1 on which the second decorative layer 2 and the like have been formed by means of sputtering. Next, an etching pattern is formed on the transparent electrode layer by means of exposure and development using the photosensitive film having a photocurable resin layer for etching as the photocurable resin layer. After that, the transparent electrode is patterned by etching the transparent electrode layer, and the etching pattern is removed, whereby the first electrode pattern 3 or the like can be formed.

Even in a case in which the photosensitive film is used as an etching resist (etching pattern), resist patterns can be obtained in the same manner as in the above-described method. As the etching, it is possible to apply etching and resist peeling using the well-known method described in Paragraphs 0048 to 0054 of JP2010-152155A.

Examples of the method for etching include ordinarily-performed wet-etching methods in which subjects are immersed in etching fluids. As the etching fluid used for wet-etching, an acidic-type etching fluid or an alkali-type etching fluid may be appropriately selected depending on etching subjects. Examples of the acidic-type etching fluid include aqueous solutions of a single acidic component such as hydrochloric acid, sulfuric acid, hydrofluoric acid, or phosphoric acid, mixed aqueous solutions of an acidic component and a salt such as iron (III) chloride, ammonium fluoride, or potassium permanganate, and the like. As the acidic component, a component obtained by combining a plurality of acidic components may be used. In addition, examples of the alkali-type etching fluid include aqueous solution of a single alkali component such as a salt of an organic amine such as sodium hydroxide, potassium hydroxide, ammonia, an organic amine, or tetramethyl ammonium hydroxide, mixed aqueous solutions of an alkali component and a salt such as potassium permanganate, and the like. As the alkali component, a component obtained by combining a plurality of alkali components may be used.

The temperature of the etching fluid is not particularly limited, but is preferably 45° C. or lower. In the present disclosure, a resin pattern that is used as an etching mask (etching pattern) is formed using the above-described photocurable resin layer and thus exhibit particularly excellent resistance to acidic and alkaline etching fluids in the above-described temperature range. Therefore, the peeling of the resin pattern during the etching step is prevented, and portions free of the resin pattern are selectively etched.

After the etching, a washing step and a drying step may be carried out as necessary in order to prevent line contamination. In the washing step, for example, the base material is washed for 10 to 300 seconds with pure water at normal temperature, and the drying step may be carried out by appropriately adjusting the air blow pressure (approximately 0.1 to 5 kg/cm$^2$) using an air blow.

Next, the method for peeling the resin pattern is not particularly limited, and examples thereof include a method in which the base material is immersed in a peeling fluid under stirring for 5 to 30 minutes at 30° C. to 80° C. and preferably at 50° C. to 80° C. The resin pattern that is used as the etching mask in the present disclosure exhibits excellent chemical resistance at 45° C. or lower as described above, but exhibits a property of being swollen by alkaline peeling fluids in a case in which the chemical temperature reaches 50° C. or higher. Due to the above-described properties, in a case in which the peeling step is carried out using a peeling fluid of 50° C. to 80° C., there is an advantage that the step time is shortened and the amount of the peeling residue of the resin pattern decreases. That is, in a case in which a difference is caused in the chemical temperature between the etching step and the peeling step, the resin pattern that is used as the etching mask in the present disclosure exhibits favorable chemical resistance in the etching step and also exhibits a favorable peeling property in the peeling step, and thus both conflicting characteristics such as the chemical resistance and the peeling property can be satisfied.

Examples of the peeling fluid include peeling fluids obtained by dissolving an inorganic alkali component such as sodium hydroxide or potassium hydroxide or an organic alkali component such as a tertiary amine or a quaternary ammonium salt in water, dimethyl sulfoxide, N-methyl pyrrolidone, or a mixed solution thereof. The resin pattern may be peeled using the above-described peeling fluid and a spray method, a shower method, a puddle method, or the like.

—Photosensitive Film Having Conductive Photocurable Resin Layer—

In a case in which the first electrode pattern 3, the second electrode pattern 4, and the guidance wire 6 are formed using the photosensitive film having a conductive photocurable resin layer, the first electrode pattern, the second electrode pattern, and the additional conductive element can be formed by transferring the conductive photocurable resin layer to the surface of the front plate 1.

In a case in which the first electrode pattern 3 and the like are formed using the photosensitive film having a conductive photocurable resin layer, even in the substrate (the front plate) having an opening portion, resist components do not leak through the opening portion, the rear side of the substrate is not contaminated, and it becomes possible to manufacture touch panels having advantages of thickness reduction and weight reduction with simple steps.

Furthermore, in a case in which the photosensitive film having a specific layer constitution in which the thermoplastic resin layer is provided between the conductive photocurable resin layer and the temporary support is used to form the first electrode pattern 3 and the like, it is possible to prevent the generation of air bubbles during the lamination of the photosensitive film and form the first electrode pattern 3, the second electrode pattern 4, and the guidance wire 6 which have excellent conductivity and small resistance.

—Use of Photosensitive Film as Liftoff Material—

In addition, it is also possible to form the first transparent electrode layer, the second transparent electrode layer, and the guidance wire using the photosensitive film as a liftoff material.

In this case, desired transparent conductive layer patterns can be obtained by carrying out patterning using the photosensitive film, then, forming the transparent conductive layer on the entire surface of the base material, and then dissolving and removing the photocurable resin layer from each of the accumulated transparent conductive layers (a liftoff method).

<Step of Laminating Overcoat Layer>

In the method for manufacturing a film sensor, in the case of forming the overcoat layer 7, it is possible to form the overcoat layer by transferring the above-described overcoat layer to the surface of the base sheet 1A on which the respective elements are randomly formed using the transfer film.

A step of laminating the overcoat layer is preferably a transferring (attaching) step. The transferring step refers to a step in which the overcoat layer is laminated on any material (for example, a base material on which the electrode pattern, the light-blocking conductive film, the guidance wire, and the like are formed) from the transfer film and consequently attached thereto. At this time, the method preferably includes a step of removing the temporary support after the lamination of the overcoat layer in the transfer film on the base material.

The overcoat layer is laminated so as to cover the electrode pattern with this step.

The step of laminating the overcoat layer on the base material on which the electrode pattern, the light-blocking conductive film, the guidance wire, and the like are formed is preferably carried out by superimposing, pressurizing, and heating the overcoat layer on the surface of the base material.

In the step of laminating the overcoat layer on the base material, it is possible to use a laminator, a vacuum laminator, or a well-known laminator such as an auto-cut laminator capable of further enhancing productivity. The laminator preferably includes any roller capable of heating subjects such as a rubber roller and is thus capable of pressurizing and heating subjects.

The temperature during the attachment of the overcoat layer to the base material in the step of laminating the overcoat layer is preferably 60° C. to 150° C., more preferably 65° C. to 130° C., and particularly preferably 70° C. to 100° C.

The linear pressure applied between the overcoat layer and the base material in the step of laminating the overcoat layer is preferably 60 to 200 N/cm, more preferably 70 to 160 N/cm, and particularly preferably 80 to 120 N/cm.

The transportation rate of the overcoat layer in the step of laminating the overcoat layer is preferably 2.0 m/min or more, more preferably 3.0 m/min or more, and still more preferably 4.0 m/min or more. During the above-described high-speed lamination, it is possible to suppress the intrusion of air bubbles during the lamination on the base material.

The method for manufacturing a film sensor preferably has an exposure step of exposing the overcoat layer and a development step of developing the exposed overcoat layer.

The exposure step of the overcoat layer and the development step will be described below.

<Step of Forming Decorative Layer>

The method for manufacturing a film sensor of the present disclosure includes a step of forming the decorative layer.

The step of forming the decorative layer is a step of forming a decorative layer by transferring the coloring composition layer from the transfer film of the present disclosure to at least one surface of the film sensor including the transparent base sheet, the electrode pattern disposed on at least one surface of the base sheet, the guidance wire connected to the electrode pattern, and the overcoat layer laminated so as to cover the electrode pattern.

In the method for manufacturing a film sensor, in the case of forming the decorative layer, it is preferable to form the decorative layer by transferring the coloring composition layer to the surface of the overcoat layer in the film sensor on which the respective elements are randomly formed using the transfer film of the present disclosure.

In the method for manufacturing a film sensor, one surface of the film sensor to which the coloring composition layer is transferred more preferably includes a region of at least a part of the guidance wire and a region of at least a part of the overcoat layer.

In a case in which the transfer film of the present disclosure includes a protective film, the method for manufacturing a film sensor preferably includes a protective film removal step of removing the protective film from the transfer film of the present disclosure before the step of laminating the decorative layer.

<Exposure Step and Development Step>

The method for manufacturing a film sensor preferably has an exposure step of exposing the overcoat layer (the curable transparent resin layer or the coloring composition layer and, preferably, the second transparent resin layer in the case of the base material on which the overcoat layer is not laminated) transferred onto the base material and a development step of developing the exposed overcoat layer (the curable transparent resin layer or the coloring composition layer and, preferably, the second transparent resin layer in the case of the base material on which the overcoat layer is not laminated).

As examples of the exposure step, the development step, and other steps, it is also possible to preferably use the method described in Paragraphs 0035 to 0051 of JP2006-23696A in the present disclosure.

The exposure step is a step of exposing the curable transparent resin layer, the coloring composition layer, and the like which have been transferred onto the electrode pattern.

Specific examples thereof include a method in which a previously-specified mask is disposed above the curable transparent resin layer and the coloring composition layer formed on the electrode pattern and then the curable transparent resin layer and the coloring composition layer are exposed to above the mask through the mask and the temporary support.

Here, as the light sources for the exposure, it is possible to appropriately select and use light sources as long as the light sources are capable of radiating light having wavelengths in a range (for example, 365 nm, 405 nm, or the like) with which the curable transparent resin layer and the coloring composition layer can be cured. Specific examples thereof include an ultrahigh-pressure mercury lamp, a high-pressure mercury lamp, a metal halide lamp, a laser direct lithographic exposure method, a DLP exposure method, and the like.

The exposure amount is, generally, approximately 5 to 200 mJ/cm$^2$ and preferably approximately 10 to 100 mJ/cm$^2$.

The light source for the exposure may be a semiconductor laser vibrating laser light having wavelengths with which the curable transparent resin layer and the coloring composition layer can be cured. Examples of the semiconductor laser include semiconductor lasers vibrating laser light having a wavelength of 390 nm or longer and shorter than 440 nm, and, as the above-described semiconductor laser, it is possible to preferably use potassium nitride-based blue lasers. Particularly, a semiconductor laser is preferably used as the light source since it is easy to form patterns using the direct lithographic exposure method. In addition, a digital direct stepper such as "DE-1AH" (trade name) manufactured by Hitachi Via Mechanics, Ltd. may be used.

As an alternative evaluation of the laser exposure, it is possible to use active light rays obtained by cutting 99.5% or more of light having a wavelength of 365 nm from light generated from a mercury lamp such as a high-pressure mercury lamp as a light source (for example, h rays) as light having a peak in a wavelength range of 390 nm or longer and shorter than 440 nm.

Examples of a filer for cutting light having a wavelength of 365 nm or shorter include a sharp cut filter "SCF-100S-39L" (trade name) manufactured by Sigmakoki Co., Ltd., a spectrometric filter "HG0405" (trade name) manufactured by Asahi Spectra Co., Ltd., and the like.

In the case of applying the active light rays from which light having a wavelength of 365 nm or shorter is cut, examples of a method for radiating the active light rays to a desired region of the curable transparent resin layer or the coloring composition layer include a method in which active light rays are radiated in an image shape through a negative mask pattern or a positive mask pattern which is termed as an artwork, thereby curing the irradiated portion.

The development step is a step of developing the exposed curable transparent resin layer, exposed coloring composition layer, and the like.

In the present disclosure, the development step is a narrowly-defined development step in which the curable transparent resin layer, the coloring composition layer, and the like which have been pattern-exposed are pattern-developed using a developer.

The development can be carried out using a developer. The developer is not particularly limited, and it is possible to use well-known developers such as the developer described in JP1993-72724A (JP-H05-72724A). Furthermore, the developer is preferably a developer in which the photocurable resin layer or the coloring composition layer performs dissolution-type development behaviors and, for example, preferably a developer including a compound having a pKa of 7 to 13 at a concentration of 0.05 to 5 mol/L.

Meanwhile, in a case in which the curable transparent resin layer or the coloring composition layer does not form any patterns, the developer is preferably a developer which performs development behaviors of not dissolving a non-alkali development-type coloring composition layer and, for example, preferably a developer including a compound having a pKa of 7 to 13 at a concentration of 0.05 to 5 mol/L. To the developer, a small amount of a water-miscible organic solvent may be further added. Examples of the water-miscible organic solvent include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, N-methyl pyrrolidone, and the like. The concentration of the organic solvent is preferably 0.1% by mass to 30% by mass.

In addition, to the developer, it is possible to further add a well-known surfactant. The concentration of the surfactant is preferably 0.01% by mass to 10% by mass.

The development method may be any one of puddle development, shower development, shower and spin development, dip development, and the like. In the case of the shower development, non-cured portions can be removed by blowing the developer to the curable transparent resin layer, the coloring composition layer, and the like after exposure by means of showering. In addition, after the development, it is preferable to blow a washing agent or the like by means of showering and remove development residue by rubbing the surface with a brush or the like. The liquid temperature of the developer is preferably 20° C. to 40° C., and the pH of the developer is preferably 8 to 13.

<Thermal Treatment>

The method for manufacturing a film sensor of the present disclosure preferably includes, after the step of forming the decorative layer by transferring the coloring composition layer, a step of thermally treating the film sensor at 130° C. to 170° C. (post baking step). With the thermal treatment at the above-described temperature, it is possible to carry out a thermal treatment without adversely influencing other members such as the electrode pattern, the guidance wire, the light-blocking conductive film, and the overcoat layer even in the method for manufacturing a film sensor in which the decorative layer is formed after the other members have been formed in advance on the film base material.

The temperature of the step of the thermal treatment is preferably 140° C. to 160° C. and particularly preferably 140° C. to 150° C.

The time of the step of the thermal treatment is preferably 1 minute to 60 minutes, more preferably 10 minutes to 60 minutes, and particularly preferably 20 minutes to 50 minutes.

<Other Steps>

The method for manufacturing a film sensor may have a post exposure step and other steps.

Furthermore, patterning exposure or full-surface exposure may be carried out after the peeling of the temporary support, or exposure may be carried out before the peeling of the temporary support and then the temporary support may be peeled off. Exposure may be carried out through a mask or digital exposure may be carried out using a laser or the like.

[Front Plate-Integrated Sensor]

A front plate-integrated sensor of the present disclosure has a transparent front plate and the film sensor of the present disclosure.

The front plate-integrated sensor is preferably an electrostatic capacitance-type input device.

Hereinafter, a preferred aspect of the front plate-integrated sensor of the present disclosure will be described in detail.

<Constitution of Front Plate-Integrated Sensor>

First, a preferred constitution of the front plate-integrated sensor of the present disclosure will be described together with methods for manufacturing individual members constituting the device.

FIG. 1 is a cross-sectional view illustrating a preferred constitution of the front plate-integrated sensor of the present disclosure. FIG. 1 illustrates an aspect in which the front plate-integrated sensor is constituted of a transparent substrate (front plate) 1, the second decorative layer (mask layer) 2, and a film sensor 43 of the present disclosure.

In FIG. 1, a side of the transparent front plate 1 on which the respective elements are provided will be referred to as the noncontact surface side. In the front plate-integrated sensor of the present disclosure, inputting is carried out by contacting or the like a contact surface (a surface opposite to the noncontact surface) of the transparent front plate 1 with a finger or the like.

In the front plate-integrated sensor of the present disclosure, the transparent front plate is preferably glass.

The transparent front plate is more preferably a glass substrate having a refractive index of 1.5 to 1.55. The refractive index of the transparent front plate is particularly preferably 1.5 to 1.52. The transparent front plate is constituted of a translucent substrate such as a glass substrate, and it is possible to use reinforced glass or the like represented by Corning's GORILLA glass ("GORILLA" is a registered trademark). In addition, as the transparent front plate, it is possible to preferably use the materials used in JP2010-86684A, JP2010-152809A, and JP2010-257492A.

Figure 2:
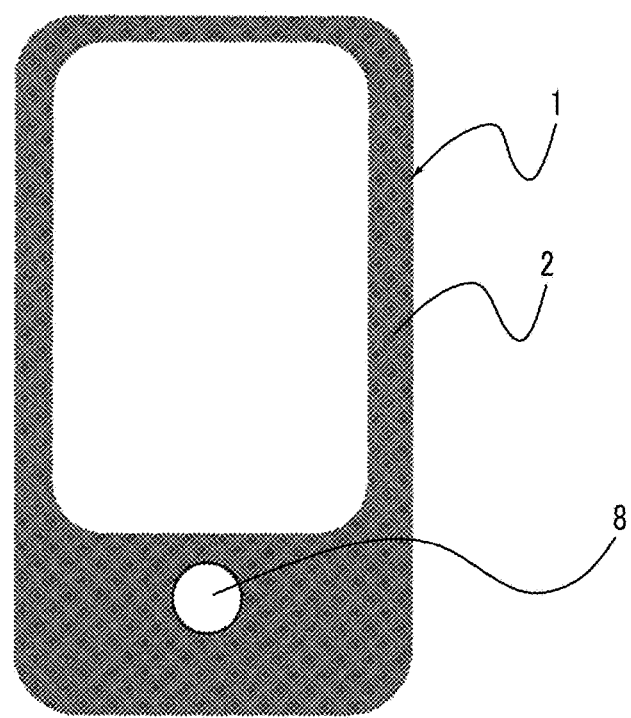
FIG. 2 is an explanatory view illustrating and example of a front plate in the present disclosure.

Furthermore, an opening portion 8 can be provided in a part of the transparent front plate 1 as illustrated in FIG. 2. In the opening portion 8, a press-type mechanical switch can be installed.

The front plate-integrated sensor of the present disclosure preferably has the second decorative layer in a region of a part of one surface of the transparent front plate.

In FIG. 1, the second decorative layer 2 is provided on the noncontact surface of the transparent front plate 1. The second decorative layer 2 is a trim-like (frame-like) pattern around a display region formed on the noncontact surface side of a touch panel front plate and is formed in order to prevent the guidance wire 6 and the like from being visible from the contact surface side.

In the front plate-integrated sensor, the second decorative layer 2 is preferably provided so as to cover a region (a region other than an input surface in FIG. 2) of a part of the transparent front plate 1 as illustrated in FIG. 2.

The second decorative layer is provided in a trim shape around the surface opposite to a region of the contact surface which is touched by a finger, a stylus, or the like in order to prevent the guidance wire of the electrode pattern from being visible from the contact side or decorate the sensor. The second decorative layer is preferably a white or black second decorative layer.

The second decorative layer is more preferably provided adjacent to the transparent front plate.

The thickness of the second decorative layer is preferably 7 µm to 30 µm.

In the front plate-integrated sensor of the present disclosure, the second decorative layer is preferably disposed between the transparent front plate and the decorative layer in the film sensor.

In the front plate-integrated sensor of the present disclosure, the orthography of the second decorative layer preferably superimposes a region of at least a part of the decorative layer in the film sensor in the case of being observed in the normal direction to the transparent front plate.

The inner edge of the decorative layer 45 in the film sensor is preferably located closer to the central side than the inner edge of the second decorative layer 2.

The distance between the surface of the transparent front plate 1 on which the second decorative layer is formed and the decorative layer 45 in the film sensor is more preferably 10 µm to 100 µm. In a case in which the distance between the surface of the front plate 1 on which the second decorative layer is formed and the decorative layer 45 is 10 µm or more, the thickness of a pressure-sensitive adhesive becomes sufficiently thick, and the adhesive force between the film sensor and the front plate 1 becomes strong. In addition, in a case in which the distance between the surface of the transparent front plate 1 on which the second decorative layer is formed and the decorative layer 45 is 100 µm or less, the sense of appearance unity in a portion surrounding a display screen improves.

<Method for Manufacturing Front Plate-Integrated Sensor>

Figure 4:
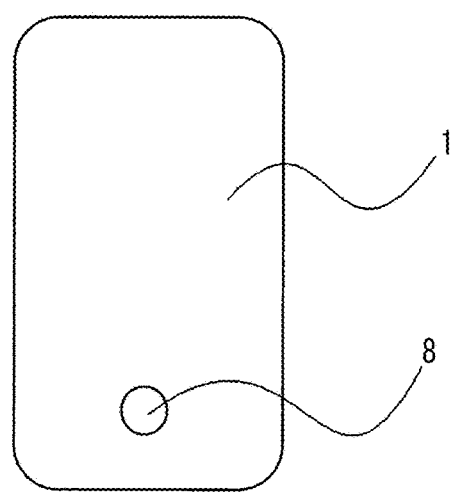
FIG. 4 is a top view illustrating an example of a reinforcement-treated glass in which an opening portion is formed.
Figure 5:
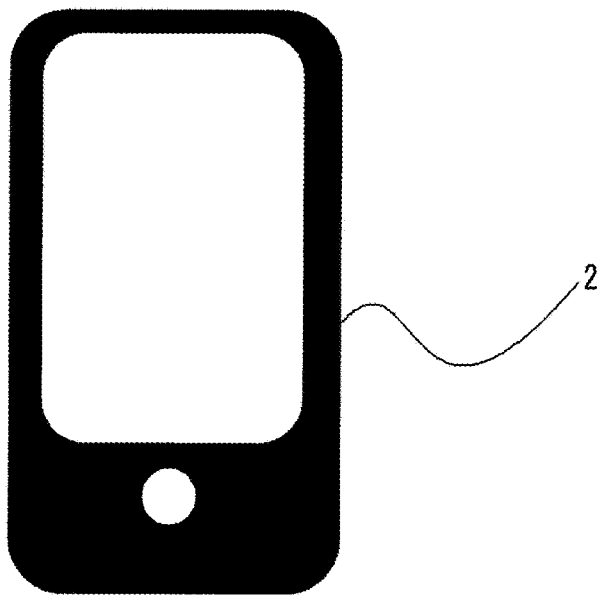
FIG. 5 is a top view illustrating an example of the front plate-integrated sensor in which a second decorative layer is formed.

Examples of aspects being formed in a process for manufacturing the front plate-integrated sensor of the present disclosure include aspects of FIG. 4 to FIG. 8. FIG. 4 is a top view illustrating an example of the transparent front plate 1 made of a reinforcement-treated glass in which the opening portion 8 is formed. FIG. 5 is a top view illustrating an example of the front plate-integrated sensor in which the second decorative layer 2 is formed.

Figure 6:
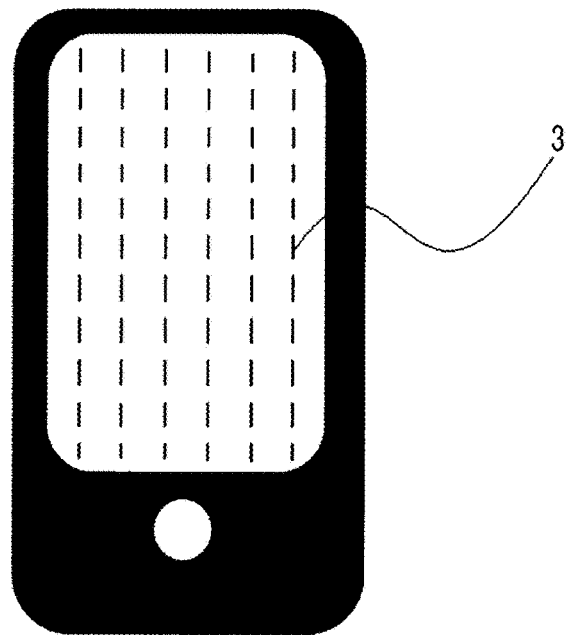
FIG. 6 is a top view illustrating an example of the front plate-integrated sensor in which a first electrode pattern is formed.
Figure 7:
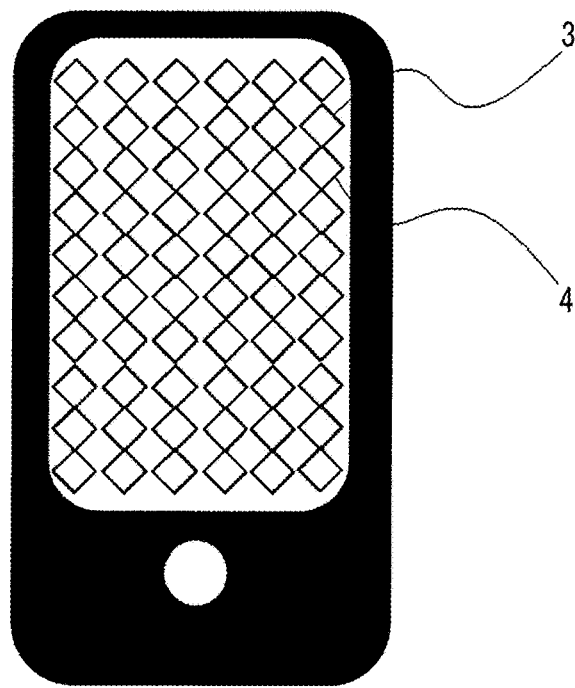
FIG. 7 is a top view illustrating an example of the front plate-integrated sensor in which first and second electrode patterns are formed.
Figure 8:
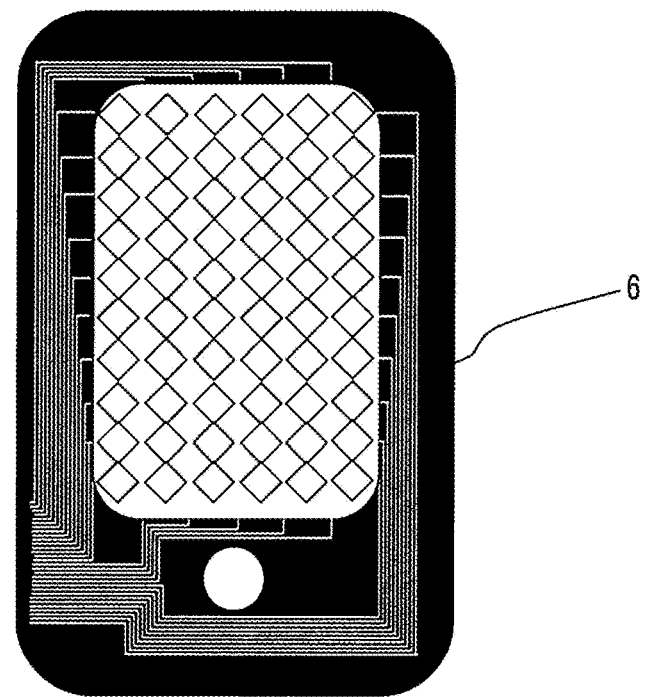
FIG. 8 is a top view illustrating an example of the front plate-integrated sensor in which a guidance wire is formed.

FIGS. 6 to 8 illustrate examples of the constitution of the front plate-integrated sensor in which the film sensor is laminated. FIG. 6 is a top view illustrating an example of the front plate-integrated sensor in which the film sensor is laminated and thus the first electrode pattern 3 is formed. FIG. 7 is a top view illustrating an example of the front plate-integrated sensor in which the film sensor is laminated and thus the first electrode pattern 3 and the second electrode pattern 4 are formed. FIG. 8 is a top view illustrating an example of the front plate-integrated sensor in which the film sensor is laminated and thus the first and second electrode patterns and the guidance wire 6 are formed. These drawings illustrate examples specifying the following description, and the scope of the present disclosure is not interpreted to be limited by these drawings.

In a method for manufacturing the front plate-integrated sensor, the second decorative layer 2 is preferably formed using a photosensitive film having a temporary support and a photocurable resin layer in this order.

In a case in which the second decorative layer is formed using the transfer film of the present disclosure or a photosensitive film, even in the substrate (the front plate) having the opening portion, resist components do not leak through the opening portion, and, particularly, in the second decorative layer in which a light-blocking pattern needs to be formed up to immediately above the boundary line of the front plate, resist components do not protrude (leak) from the glass end, and thus the rear side of the front plate is not contaminated, and it is possible to manufacture front plate-integrated sensors having a reduced thickness and a reduced weight with a simple step.

In a case in which the second decorative layer is formed using the photosensitive film, patterns can be obtained by laminating the photosensitive film on the base material, then, exposing the photosensitive film in a pattern shape as necessary, and removing the non-exposed portions in the case of a negative-type material or the exposed portions in the case of a positive-type material by means of a development treatment. In the development, a thermoplastic resin layer and a photocurable resin layer may be developed and removed using separate fluids or may be removed using the same fluid. Well-known development facilities such as a brush and a high-pressure jet may be combined together as necessary. After the development, post exposure and post baking may be carried out as necessary.

(Formation of Second Decorative Layer Using Photosensitive Film)

The second decorative layer 2 can be formed by transferring the photocurable resin layer to the transparent front plate 1 or the like using the photosensitive film. For example, in the case of forming a black second decorative layer 2, the black second decorative layer can be formed by using the photosensitive film having a black photocurable resin layer as the photocurable resin layer and transferring the black photocurable resin layer to the surface of the transparent front plate 1.

Furthermore, in a case in which the photosensitive film having a specific layer constitution in which the thermoplastic resin layer is provided between the photocurable resin layer and the temporary support is used to form the second decorative layer 2 which needs to block light, it is possible to prevent the generation of air bubbles during the lamination of the photosensitive film and form a high-quality second decorative layer 2 from which light does not leak.

[Image Display Device]

An image display device of the present disclosure is an image display device including the front plate-integrated sensor of the present disclosure as a constituent element.

To the front plate-integrated sensor of the present disclosure and the image display device including the front plate-integrated sensor, it is possible to apply the constitution disclosed by "Advanced touch panel technology" (published by Techno Times Co., Ltd. on Jul. 6, 2009), "Technology and development of touch panels" edited by Yuji Mitani, CMC Publishing Co., Ltd. (December 2004), FPD International 2009 Forum T-11 lecture textbook, Cypress Semiconductor Corporation application note AN2292, and the like.

EXAMPLES

Hereinafter, the embodiments of the present invention will be more specifically described using examples. Materials, amounts used, ratios, processing contents, processing orders, and the like described in the following examples can be appropriately modified within the scope of the gist of the present disclosure. Therefore, the embodiments of the present invention are not limited to specific examples described below. Meanwhile, unless particularly otherwise described, "parts" and "%" are mass-based.

Example 1

<Preparation of Coloring Composition>

Carbon black, a dispersant, a polymer, and a solvent were mixed together so as to obtain a composition of the following K pigment dispersion 1, and the K pigment dispersion 1 was obtained using three rolls and a bead mill.

A black composition K1 (coloring composition) which was a coloring composition for forming a coloring composition layer was obtained in the following order.

First, the K pigment dispersion 1 as much as shown in Table 1 and propylene glycol monomethyl ether acetate (MMPG-Ac) were weighed, mixed together at a temperature of 24° C. (±2° C.), and stirred for 10 minutes at 150 rounds per minute (RPM). Next, solvents (methyl ethyl ketone and 1-methoxy-2-propylacetate), a binder, phenothiazine, a polymerizable compound, a polymerization initiator, and a surfactant were weighed as much as shown in Table 1, added in this order to a solution stirred at 25° C. (±2° C.), and stirred at a temperature of 24° C. (±2° C.) for 30 minutes at 150 RPM.

Meanwhile, the amounts shown in Table 1 are the number of mass-based parts.

(K Pigment Dispersion 1)

| | |
|---|---|
| Resin-coated carbon black produced according to Paragraphs 0036 to 0042 of JP5320652B | 13.1% by mass |
| The following dispersant 1 | 0.65% by mass |
| Polymer (a random copolymer of benzyl methacrylate and methacrylic acid (in a molar ratio of 72/28), weight-average molecular weight: 37,000) | 6.72% by mass |
| Propylene glycol monomethyl ether acetate | 79.53% by mass |

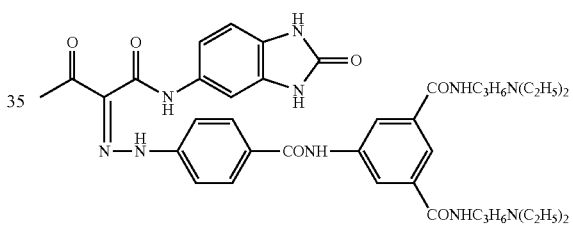

Dispersant 1

<Production of Transfer Film>

A coating fluid for a thermoplastic resin layer made of the following formulation H1 was applied and dried on a 75 μm-thick polyethylene terephthalate film temporary support using slit-shaped nozzles, thereby forming a thermoplastic resin layer. Next, a coating fluid for an interlayer made of the following formulation P1 was applied and dried on the thermoplastic resin layer, thereby forming an interlayer. Furthermore, the black composition K1 which was a coloring composition for forming a coloring composition layer was applied and dried on the interlayer, thereby forming a coloring composition layer. The thermoplastic resin layer having a dried thickness of 15.1 μm, the interlayer having a dried thickness of 1.6 μm, and the black coloring composition layer having a dried thickness of 2.0 μm were provided on the temporary support in the above-described manner, and finally, a protective film (12 μm-thick polypropylene film) was pressed to the laminate.

A transfer film of Example 1 in which the temporary support, the thermoplastic resin layer, the interlayer (oxygen insulation film), the black (K) coloring composition layer, and the protective film were integrated together was produced in the above-described manner.

| (Coating Fluid for Thermoplastic Resin Layer: Formulation H1) | |
| --- | --- |
| Methanol | 11.1 parts by mass |
| Propylene glycol monomethyl ether acetate | 6.36 parts by mass |
| Methyl ethyl ketone | 52.4 parts by mass |
| Methyl methacrylate/2-ethylhexyl acrylate/benzyl methacrylate/methacrylic acid copolymer (copolymerization compositional ratio (molar ratio) = 55/11.7/4.5/28.8, molecular weight = 100,000, glass transition temperature (Tg) ≈70° C.) | 5.83 parts by mass |
| Styrene/acrylic acid copolymer (copolymerization compositional ratio (molar ratio) = 63/37, weight-average molecular weight = 10,000, Tg ≈100° C.) | 13.6 parts by mass |
| 2,2-Bis[4-(methacryloxypolyethoxy)phenyl]propane (manufactured by Shin-Nakamura Chemical Co., Ltd.) | 9.1 parts by mass |
| Fluorine-based polymer (a copolymer of 40 parts of $C_6F_{13}CH_2CH_2OCOCH=CH_2$, 55 parts of $H(OCH(CH_3)CH_2)_7OCOCH=CH_2$, and 5 parts of $H(OCH_2CH_2)_7OCOCH=CH_2$, weight-average molecular weight: 30,000, solution of 30% by mass of methyl ethyl ketone, manufactured by DIC Corporation, trade name: MEGAFACE F780F). | 0.54 parts by mass |

| (Coating Fluid for Interlayer: Formulation P1) | |
| --- | --- |
| PVA205 (polyvinyl alcohol, manufactured by Kuraray Co., Ltd., degree of saponification = 88%, degree of polymerization 550) | 32.2 parts by mass |
| Polyvinylpyrrolidone (trade name: K-30, manufactured by ISB Corporation) | 14.9 parts by mass |
| Distilled water | 524 parts by mass |
| Methanol | 429 parts by mass |

<Evaluation of Optical Density>

For the obtained transfer film of Example 1, the optical density was measured using X-Rite 361T (V) (manufactured by Sakata Inx Eng. Co., Ltd.). The value is preferably high, A, B, or C is in a practical range, A or B is preferred, and A is more preferred. The obtained result is shown in Table 3.

—Evaluation Standards—

A: 3.4 or higher
B: 2.5 or higher and lower than 3.4
C: 1.1 or higher and lower than 2.5
D: 0.6 or higher and lower than 1.1
E: lower than 0.6

<Evaluation of Sensitivity>

The protective film was removed from the obtained transfer film of Example 1, the surface of the black coloring composition layer which was exposed due to the removal of the protective film and the surface of a cycloolefin copolymer film (COP film, manufactured by TOPAS Advanced Polymers GmbH, trade name: TOPAS 5013L-10) which served as a substrate were superimposed with each other so as to come into contact with each other and were laminated using a laminator (manufactured by Hitachi Plant Mechanics Co., Ltd. (LamicII type)) at a rubber roller temperature of 130° C., a linear pressure of 100 N/cm, and a transportation rate of 2.2 m/minute. Subsequently, the temporary support of polyethylene terephthalate was peeled off at the interface with the thermoplastic resin layer, thereby removing the temporary support. After the peeling of the temporary support, using a proximity-type stepper having an ultrahigh-pressure mercury lamp (manufactured by Hitachi High-Tech Fielding Corporation), the distance between the surface of an exposure mask (a silica exposure mask having an image pattern) and the black coloring composition layer was set to 200 μm in a state in which the substrate and the mask were made to stand vertically, and pattern-exposure was carried out at an exposure amount of 70 mJ/cm².

Next, shower development was carried out using a triethanolamine-based developer (containing 30% by mass of triethanolamine, a liquid obtained by diluting trade name: T-PD2 (manufactured by Fujifilm Corporation) with pure water 12 times (mixing T-PD2 and pure water in a ratio of 1 part to 11 parts)) at 30° C. and a flat nozzle pressure of 0.1 MPa for 20 seconds, thereby removing the thermoplastic resin layer and the interlayer. Subsequently, the air was blown to the top surface of the COP film so as to drain liquid, and then the amount of liquid remaining on the substrate was decreased by blowing pure water for 10 seconds by means of showering so as to carry out pure water shower washing and blowing the air.

After that, the shower pressure was set to 0.1 MPa using a sodium carbonate/sodium hydrogen carbonate-based developer (a liquid obtained by diluting trade name: T-CD1 (manufactured by Fujifilm Corporation) with pure water five times (mixing T-CD1 and pure water in a ratio of 1 part to 4 parts)) at 30° C., and the coloring composition layer was developed for 30 seconds and washed with pure water.

Subsequently, the coloring composition layer was washed by blowing a surfactant-containing washing liquid (a liquid obtained by diluting T-SD3 (trade name, manufactured by Fujifilm Corporation) with pure water 10 times) by means of showering at 33° C. and a corn-type nozzle pressure of 0.1 MPa for 20 seconds. Furthermore, residues were removed by spraying ultrapure water at a pressure of 9.8 MPa in an ultrahigh-pressure washing nozzle.

The pattern wire width (W1) with respect to the mask wire pattern of 12.0 μm (W2) was measured using a fine line width measurement instrument (CP-30; manufactured by Softworks Co., Ltd.), and the sensitivity was evaluated according to the following evaluation standards. The value is preferably high, A, B, or C is in a practical range, A or B is preferred, and A is more preferred. The obtained result is shown in Table 3.

—Evaluation Standards—

A: 15 μm or more
B: 12 μm or more and less than 15 μm
C: 10 μm or more and less than 12 μm
D: 5 μm or more and less than 10 μm
E: less than 5 μm <Evaluation of Surface Resistance>

The protective film was removed from the transfer film of Example 1 produced using the above-described manufacturing method, the surface of the black coloring composition layer which was exposed due to the removal of the protective film and the surface of an EAGLE XG glass substrate (manufactured by Corning Incorporated) which served as a substrate were superimposed with each other so as to come into contact with each other and were laminated using a laminator (manufactured by Hitachi Plant Mechanics Co., Ltd. (LamicII type)) at a rubber roller temperature of 130° C., a linear pressure of 100 N/cm, and a transportation rate of 2.2 m/minute. Subsequently, the temporary support of polyethylene terephthalate was peeled off at the interface with the thermoplastic resin layer, thereby removing the temporary support. After the peeling of the temporary support, using a proximity-type stepper having an ultrahigh-pressure mercury lamp (manufactured by Hitachi High-Tech Fielding Corporation), the distance between the surface of an exposure mask (a silica exposure mask having an image pattern) and the black coloring composition layer was set to 200 µm in a state in which the substrate and the mask were made to stand vertically, and pattern-exposure was carried out at an exposure amount of 500 mJ/cm².

Next, shower development was carried out using a triethanolamine-based developer (containing 30% by mass of triethanolamine, a liquid obtained by diluting trade name: T-PD2 (manufactured by Fujifilm Corporation) with pure water 12 times (mixing T-PD2 and pure water in a ratio of 1 part to 11 parts)) at 30° C. and a flat nozzle pressure of 0.1 MPa for 20 seconds, thereby removing the thermoplastic resin layer and the interlayer. Subsequently, the air was blown to the top surface of this bare wafer substrate so as to drain liquid, and then the amount of liquid remaining on the substrate was decreased by blowing pure water for 10 seconds by means of showering so as to carry out pure water shower washing and blowing the air. After that, the substrate was heated in an oven at 145° C. for 60 minutes, thereby obtaining a cured film.

For this cured film, the surface resistance was measured using a HIRESTA-UX MCP-HT800 (manufactured by Mitsubishi Chemical Analytech Co., Ltd.). Meanwhile, the evaluation standards are as described below. The value (Ω/sq) is preferably high, A, B, or C is in a practical range, A or B is preferred, and A is more preferred. The obtained result is shown in Table 3.

—Evaluation Standards—
A: $1 \times 10^{13}$ or more
B: $1 \times 10^{12}$ or more and less than $1 \times 10^{13}$
C: $1 \times 10^{11}$ or more and less than $1 \times 10^{12}$
D: $1 \times 10^{10}$ or more and less than $1 \times 10^{11}$
E: less than $1 \times 10^{10}$ <Production of Dry Film Resist for Overcoat Layer>

Next, a method for producing a dry film resist for an overcoat layer will be described. Propylene glycol monomethyl ether and toluene (1) as much as described below were added to a flask equipped with a stirrer, a reflux cooling pipe, an inert gas introduction opening, and a thermometer and were heated to 80° C. in a nitrogen gas atmosphere, and a mixture having components described in (2) as much as described below was uniformly added dropwise thereto for four hours while maintaining the reaction temperature at 80° C.±2° C. After the dropwise addition of the mixture, the components were continuously stirred for six hours while maintaining the liquid temperature at 80° C.±2° C., thereby obtaining a solution (solid content: 45% by mass) (A1) of a binder polymer having a weight-average molecular weight of approximately 80,000. The weight-average molecular weight of the binder polymer was 65,000, and the acid value was 78 mgKOH/g.

| (1) | |
|---|---|
| Propylene glycol monomethyl ether | 62 parts by mass |
| Toluene | 62 parts by mass |
| (2) | |
| Methacrylic acid | 12 parts by mass |
| Methyl methacrylate | 58 parts by mass |
| Ethyl acrylate | 30 parts by mass |
| 2,2-Azobisisobutyronitrile | 1.2 parts by mass |

The following materials were mixed together for 30 minutes using a magnetic stirrer, thereby producing a photosensitive coating fluid for a resist A.

| | |
|---|---|
| Solution of binder polymer (A1) | 133 parts by mass |
| IRGACURE OXE01 (manufactured by BASF, photopolymerization initiator) | 5 parts by mass |
| KAYARAD PET-30 (manufactured by Nippon Kayaku Co., Ltd., mixture of pentaerythritol triacrylate and pentaerythritol tetraacrylate) | 40 parts by mass |
| 2,2'-Methylene-bis(4-ethyl-6-tert-butylphenol) | 0.1 parts by mass |
| Octamethylcyclotetrasiloxane | 0.1 parts by mass |
| Methyl ethyl ketone | 50 parts by mass |

A 50 µm-thick polyethylene terephthalate film was used as a temporary support, the above-produced photosensitive coating fluid for a resist A was uniformly applied onto the temporary support using a slit-shaped nozzle and was dried at 100° C. for three minutes using a hot-air convection dryer so as to remove the solvent, thereby forming a photosensitive layer and obtaining a dry film resist for an overcoat layer. The thickness of the obtained photosensitive layer was 2.5 µm.

<Production of Film Sensor>

A 200 µm-thick colorless polyester film unwound from a roll was used as a transparent base sheet, and a transparent conductive film (a conductive film for a first electrode pattern or a second electrode pattern) made of an indium tin oxide was formed on a single surface of the colorless polyester film to a thickness of 200 nm using a sputtering method, and a copper film (a conductive film for a light-blocking conductive film and a guidance wire) was formed on the transparent conductive film to a thickness of 500 nm using a sputtering method, thereby preparing a conductive film.

Next, a set of the conductive films were laminated together using a transparent pressure-sensitive adhesive material, thereby obtaining a laminate having the transparent conductive film and the conductive film for a light-blocking conductive film and a guidance wire laminated on either surface.

After that, 10 nm-thick first photoresist layers were respectively formed on both full-surfaces of the laminate using the dry film resist including a negative-type acrylic photosensitive layer that could be developed with a solution of 1% sodium carbonate, a mask having an electrode pattern in an X direction was placed on one surface, a mask having an electrode pattern in a Y direction was placed on the other surface, both surfaces of the laminate were exposed to a metal halide lamp at the same time and were developed by being immersed in a solution of 1% sodium carbonate.

Next, the transparent conductive film made of an indium tin oxide and the copper film in a portion in which the first photoresist layer patterned with an etchant of ferric chloride was not laminated were removed by etching at the same time. As a result, a laminate of a second electrode pattern in the X direction and a light-blocking conductive film was formed on one surface side of a central window portion in the transparent base sheet so that the light-blocking conductive film was exposed. A laminate of a first electrode pattern in the Y direction and a light-blocking conductive film was formed on the other surface in a central window portion of the transparent base sheet so that the light-blocking conductive film was exposed. In an outer frame portion surrounding the central window portion, a laminate of the first electrode pattern (or the second electrode pattern), the light-blocking conductive film, and a fine guidance pattern having an average line width of 20 µm which was used as a guidance wire connected to the electrode pattern was formed so that the guidance wire is exposed on each of both (front and rear) surfaces.

Next, the first photoresist layers on both surfaces of the laminate were peeled off, then, 10 nm-thick second photoresist layers were respectively formed on both full-surfaces using the dry film resist including a negative-type acrylic photosensitive layer that could be developed with a solution of 1% sodium carbonate, masks were placed on both surfaces of the second photoresist layers, both surface sides were exposed to a metal halide lamp at the same time and were developed by being immersed in a solution of 1% sodium carbonate.

Next, in a case in which the laminate was immersed in a hydrogen peroxide solution in an acidic atmosphere, the light-blocking conductive film that was the exposed copper film in the central window portion was removed by etching, thereby exposing the first electrode pattern or the second electrode pattern which was the indium tin oxide film.

Next, after the second photoresist layers on both surfaces of the laminate were peeled off, third photoresist layers were formed respectively on both full-surfaces using the dry film resist for an overcoat layer, masks were placed in outer frame portions excluding terminal portions on both surfaces of the third photoresist layers, both surface sides were exposed to a metal halide lamp at the same time and were developed by being immersed in a solution of 1% sodium carbonate, thereby forming overcoat layers so as to cover the electrode patterns.

Next, using the transfer film of Example 1, the 2 μm-thick coloring composition layer was transferred as a fourth photoresist layer to the entire surface on one surface side (the side on which the second electrode pattern was formed) including a region of at least a part of the guidance wire and a region of at least a part of the overcoat layer from the transfer film of Example 1. A mask was placed on the coloring composition layer, and only the surface of the fourth photoresist layer was exposed using a metal halide lamp and was developed by being immersed in a solution of 1% sodium carbonate.

After that, the fourth photoresist layer was cured by being heated at 145° C. for 30 minutes in an oven.

The remaining black fourth photoresist layer was used as a frame-like decorative layer.

Next, a portion of the film sensor as large as one film sensor was cut out, thereby obtaining a film sensor of Example 1.

Meanwhile, the film sensor of Example 1 had a constitution obtained by removing the transparent film 11 from the schematic view of the film sensor illustrated in FIG. 11A, and a portion of the light-blocking conductive film 9 was the same member as the guidance wire 6.

<Evaluation of Transferring Property>

Figure 12:
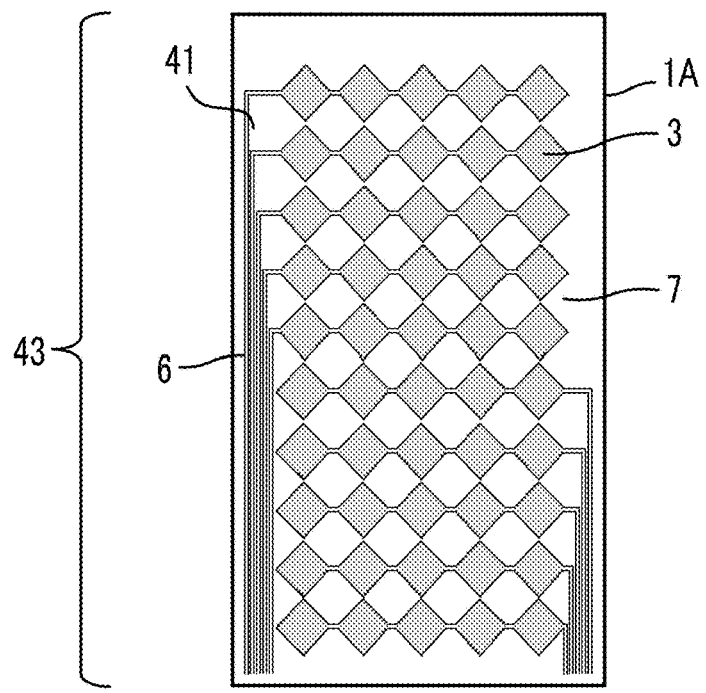
FIG. 12 is a view for describing a region along an overcoat layer of a boundary between the guidance wire and the overcoat layer in an example of a method for manufacturing a film sensor of the present disclosure.

The number of air bubbles intruding into the decorative layer during the formation of the decorative layer by means of transferring in a region along the overcoat layer in the boundary between the guidance wire and the overcoat layer was observed using an optical microscope, and the transferring property was evaluated according to the following standards. The region along the overcoat layer refers to a portion in contact with the bottom end of a side portion of a level constituting the overcoat layer in a direction perpendicular to a lamination direction (film thickness direction) of the transfer film. In the schematic view of the film sensor illustrated in FIG. 11A, there is a level difference in the boundary between the guidance wire 6 and the overcoat layer 7. In addition, a schematic view of the region along the overcoat layer in the boundary between the guidance wire 6 and the overcoat layer 7 is illustrated in FIG. 12.

In the evaluation of the transferring property, the number of air bubbles is preferably small, A, B, or C is in a practical range, A or B is preferred, and A is more preferred. The obtained result is shown in Table 3.

—Evaluation Standards—
A: The number of air bubbles was less than five.
B: The number of air bubbles was five or more and less than 30.
C: The number of air bubbles was 30 or more and less than 50.
D: The number of air bubbles was 50 or more and less than 100.
E: The number of air bubbles was 100 or more.

<Evaluation of Edge Roughness>

In the film sensor of Example 1, the inside portion of the frame-like decorative layer was observed using a laser microscope (VK-9500, manufactured by Keyence Corporation, 50-time field lens), the difference between the most swollen place (peak portion) and the most narrowed place (valley portion) out of edge locations in a view was obtained as an absolute value, the average value of absolute values obtained by observing five views was computed, and the computed average value was considered as the edge roughness. The value of the edge roughness is preferably small since the outline of a display screen of a cover glass-integrated sensor becomes sharp, A, B, or C is in a practical range, A or B is preferred, and A is more preferred. The obtained result is shown in Table 3.

—Evaluation Standards—
A: Less than 1 μm
B: 1 μm or more and less than 2 μm
C: 2 μm or more and less than 4 μm
D: 4 μm or more and less than 7 μm
E: 7 μm or more <Production of Front Plate-Integrated Sensor>

As a transparent front plate, a 0.7 mm-thick glass substrate made of borosilicate glass was used. A 7 μm-thick second decorative layer was formed using black ink by means of screen printing in a peripheral portion on a surface of the transparent front plate to which the film sensor was to be attached, thereby obtaining a cover glass.

The film sensor of Example 1 was attached to the side of the cover glass on which the second decorative layer was formed using a transparent pressure-sensitive adhesive material, thereby producing a front plate-integrated sensor (hereinafter, also referred to as "cover glass-integrated sensor") having the second decorative layer disposed between the transparent front plate and the decorative layer in the film sensor.

In the cover glass-integrated sensor of Example 1, the inner edge of the decorative layer in the film sensor was located closer to the central side by 0.1 mm than the inner edge of the second decorative layer in the transparent front plate, the orthography of the second decorative layer superimposed a region of at least a part of the decorative layer in the film sensor in the case of being observed in the normal direction to the transparent front plate. In addition, the distance between the surface of the glass substrate that was the transparent front plate to which the film sensor was attached and the decorative layer in the film sensor was 25 μm.

Meanwhile, the front plate-integrated sensor of Example 1 had a constitution obtained by removing the transparent film 11 from the schematic view of the front plate-integrated sensor illustrated in FIG. 1, and a portion of the light-blocking conductive film 9 was the same member as the guidance wire 6.

Examples 2 to 11, 13 to 22, and Comparative Examples 1 to 3

Transfer films of individual examples and comparative examples were produced and evaluated in the same manner as in Example 1 except for, in the manufacturing of the transfer film of Example 1, coloring compositions having a composition shown in Table 1 or Table 2 were used instead of the coloring composition for forming a coloring composition layer, and the film thickness of the coloring composition layer was changed to film thicknesses shown in Table 1 or Table 2.

After that, film sensors and cover glass-integrated sensors of the respective examples and comparative examples were produced and evaluated in the same manner as in Example 1 except for, in the manufacturing of the film sensor and the cover glass-integrated sensor of Example 1, the transfer film of Example 1 was changed to the transfer films of the respective examples and comparative examples. The obtained results are shown in Table 3.

A K pigment dispersion 2 and an R pigment dispersion 3 shown in Table 1 or Table 2 were produced by respectively mixing a pigment, a dispersant, a polymer, and a solvent together so as to obtain the following compositions and using three rolls and a bead mill. Meanwhile, Nipex 35 manufactured by Onion Engineered Carbons described below is carbon black having a surface not coated with any resins.

| (K Pigment Dispersion 2) | |
|---|---|
| Carbon black (Nipex 35 manufactured by Onion Engineered Carbons) | 13.1% by mass |
| Dispersant 1 described above | 0.65% by mass |
| Polymer (a random copolymer of benzyl methacrylate and methacrylic acid (in a molar ratio of 72/28), weight-average molecular weight: 37,000) | 6.72% by mass |
| Propylene glycol monomethyl ether acetate | 79.53% by mass |

| (R Pigment Dispersion 3) | |
|---|---|
| C.I. Pigment Red 177 (PR 177; primary particle 15 to 60 nm) | 10 parts by mass |
| Dispersant (BYK2000, manufactured by BYK Additives & Instruments, solid content: 40% by mass) | 10 parts by mass |
| Styrene/benzyl methacrylate/acrylic acid/2-hydroxymethyl acrylate copolymer (molar ratio: 30/40/10/20, acid value: 70 mgKOH/g, molecular weight: 6,000) | 4 parts by mass |
| Propylene glycol monomethyl ether acetate | 76 parts by mass |

Example 12

A transfer film of Example 12 was produced and evaluated in the same manner as in Example 1 except for, in the manufacturing of the transfer film of Example 1, the black composition K1 which was a coloring composition for forming a coloring composition layer was changed to a coloring composition shown in Table 1. The obtained result is shown in Table 3.

After that, a film sensor of Example 12 was produced and evaluated in the same manner as in Example 1 except for, in the manufacturing of the film sensor of Example 1, the transfer film of Example 1 was changed to the transfer films of Example 12. The obtained result is shown in Table 3.

A 7 μm-thick second decorative layer was formed using black ink by means of screen printing in a peripheral portion on a noncontact surface of the transparent front plate made of a 0.2 mm-thick PET base, thereby obtaining a front plate. In the end, the fourth photoresist layer side of the film sensor of Example 12 and the second decorative layer side of the front plate were attached together using a transparent pressure-sensitive adhesive material, thereby producing a front plate-integrated sensor.

In the front plate-integrated sensor of Example 12, the inner edge of the decorative layer in the film sensor was located closer to the central side by 0.1 mm than the inner edge of the second decorative layer in the transparent front plate, the orthography of the second decorative layer superimposed a region of at least a part of the decorative layer in the film sensor in the case of being observed in the normal direction to the transparent front plate. In addition, the distance between the rear surface of the glass substrate that was the transparent front plate to which the film sensor was attached and the decorative layer in the film sensor was 25 μm.

TABLE 1

| Coloring composition | | Example 1 | Example 2 | Example 3 | Example 4 | Example 5 | Example 6 | Example 7 | Example 8 |
|---|---|---|---|---|---|---|---|---|---|
| Black or white pigment | K pigment dispersion 1 | 137.4 | 137.4 | 137.4 | 137.4 | 137.4 | 137.4 | 137.4 | 137.4 |
| | K pigment dispersion 2 | | 15.6 | | | | | | 15.6 |
| Other particles | R pigment dispersion 3 | | | | | | | | |
| Polymerizable compound | Dipentaerythritol (penta/hexa)acrylate (manufactured by Nippon Kayaku Co., Ltd., KAYARAD DPHA) | 19.5 | 10.5 | 19.5 | 9.0 | 7.0 | 7.0 | 7.0 | 19.5 |
| | Ethoxylated bisphenol A diacrylate (A-BPE-10, manufactured by Shin-Nakamura Chemical Co., Ltd.) | | | 6.5 | | | | | 6.5 |
| | Monomer mixture (the polymerizable compound described in Paragraph [0111] of JP2012-78528A (b2-1, n = 1: the content ratio of tripentaerythritol octaacrylate: 85%, the sum of n = 2 and n = 3 as impurities: 15%) | | 9.0 | | 10.5 | 7.0 | 7.0 | 3.0 | |
| | Urethane-based monomer: UK OLIGOMER UA-32P, manufactured by Shin-Nakamura Chemical Co., Ltd., non-volatile component: 75%, 1-methoxy-2-propyl acetate: 25% | | | | | | | | |
| | Tricyclodecanediol dimethanol diacrylate (A-DCP, manufactured by Shin-Nakamura Chemical Co., Ltd.) | 6.5 | 6.5 | | 6.5 | 12.0 | 12.0 | 16.0 | |
| Binder | 1-Methoxy-2-propanol of (a glycidyl methacrylate adduct (d) of cyclohexyl methacrylate (a), methyl methacrylate (b), and a methacrylic acid copolymer (c)) (composition (% by mass): a/b/c/d = 46/1/10/43, weight-average molecular weight: 36,000, acid value: 66 mgKOH/g, methyl ethyl ketone solution (solid content: 45%)) | 81.2 | 97.8 | 89.7 | 89.7 | 89.7 | 87.7 | 87.7 | 97.8 |
| | 1-Methoxy-2-propanol of a copolymer of benzyl methacrylate (a) and methacrylic acid (b) (composition (% by mass): a/b = 70/30, weight-average molecular weight: 5,000, acid value: 112 mgKOH/g, methyl ethyl ketone solution (solid content: 45%) | | | | | | | | |
| | 1-Methoxy-2-propanol of a copolymer of allyl methacrylate (a) and methacrylic acid (b) (composition (% by mass): a/b = 80/20, weight-average molecular weight: 30,000, acid value: 66 mgKOH/g, methyl ethyl ketone solution (solid content: 20%) | | | | | | | | |
| | 1-Methoxy-2-propanol of a copolymer of benzyl methacrylate (a), methacrylic acid (b), and hydroxyethyl methacrylate (c) (composition (% by mass): a/b/c = 60/21/19, weight-average molecular weight: 14,000, acid value: 33 mgKOH/g), methyl ethyl ketone solution (solid content: 39%) | | | | | | | | |
| Initiator | 1,2-Octane dione-[4-(phenylthio)-2-(o-benzoyloxime)] (Irgacure OXE-01, manufactured by BASF) | 9.2 | | | | | | | |
| | Ethane-1-one, 1-[9-ethyl-6-(2-methylbenzoyl)-9H-carbazole-3-yl],1-(O-acetyloxime) (Irgacure OXE-02, manufactured by BASF) | | 3.2 | 3.2 | 3.2 | 3.2 | 3.2 | 3.2 | 3.2 |
| | 2,4-Bis(trichloromethyl)-6-[4′-(N,N-bis(ethoxycarbonylmethyl)amino-3′-bromophenyl]-s-triazine Y1: 2-methyl-1-[4-(methylthio)phenyl]-2-morpholino-propane-1-one (IRGACURE 907, manufactured by BASF) | | | | | | | | |
| Thiol | 2,4-Diethylthioxanthone ("KAYACURE DETX-S" manufactured by Nippon Kayaku Co., Ltd.) | | | | | | | | |
| | 1,4-Bis(3-mercaptobutyryloxy)butane (KARENZMT BD1 manufactured by Showa Denko K. K.) | | 2.2 | | | | | | |
| | 1,3,5-Tris(3-mercaptobutyryloxyethyl)-1,3,5-triazine-2,4,6(1H,3H,5H)-trione (KARENZMT NR1 manufactured by Showa Denko K. K.) | | | | 2.2 | | | | |
| | Pentaerythritol tetrakis(3-mercaptobutyrate) (KARENZMT PE1 manufactured by Showa Denko K. K.) | | | 2.2 | | 2.2 | | | 2.2 |
| | Pentaerythritol tetrakis(3-mercaptopropionate) ("PEMP" manufactured by Sakai chemical Industry Co., Ltd.) | | | | | | | | |
| Polymerization inhibitor | N-phenyl mercaptobenzoimidazole | | | | | | 3.1 | 3.1 | |
| | Phenothiazine | 0.3 | 0.3 | 0.3 | 0.3 | 0.3 | 0.3 | 0.3 | 0.3 |
| Surfactant | The following structure 1 | 0.4 | 0.4 | 0.4 | 0.4 | 0.4 | 0.4 | 0.4 | 0.4 |
| Solvent | 1-Methoxy-2-propyl acetate | 238.7 | 229.7 | 234.1 | 234.1 | 234.1 | 235.2 | 235.2 | 232.0 |
| | Methyl ethyl ketone | 321.3 | 321.3 | 321.3 | 321.3 | 321.3 | 321.3 | 321.3 | 321.3 |

TABLE 1-continued

| | Coloring composition | Example 9 | Example 10 | Example 11 | Example 12 | Example 13 | Example 14 | Example 15 | Example 16 |
|---|---|---|---|---|---|---|---|---|---|
| Transfer film | Content of black or white pigment (wt % with respect to solid substances other than solvent, (a)) | 18.0 | 15.7 | 18.0 | 18.0 | 18.0 | 18.0 | 18.0 | 15.7 |
| | Coated film thickness (μm, (b)) | 2.0 | 2.0 | 2.0 | 2.0 | 2.0 | 2.0 | 2.0 | 2.0 |
| | (a) × (b) | 36.0 | 31.3 | 36.0 | 36.0 | 36.0 | 36.0 | 36.0 | 31.3 |
| Black or white pigment | K pigment dispersion 1 | 119.5 | 87.8 | 87.8 | 120.0 | 137.4 | 137.4 | 119.5 | 25.2 |
| | K pigment dispersion 2 | | | | | | | | |
| | R pigment dispersion 3 | 15.6 | | | | | 15.6 | | |
| Other particles | | 13.0 | 19.5 | 19.5 | 19.5 | | 19.5 | 10.5 | 15.0 |
| Polymerizable compound | Dipentaerythritol (penta/hexa)acrylate (manufactured by Nippon Kayaku Co., Ltd., KAYARAD DPHA) | | | | | | | | |
| | Ethoxylated bisphenol A diacrylate (A-BPE-10, manufactured by Shin-Nakamura Chemical Co., Ltd.) | | | | | | | | |
| | Monomer mixture (the polymerizable compound described in Paragraph [0111] of JP2012-78528A (b2-1, n = 1: the content ratio of tripentaerythritol octaacrylate: 85%, the sum of n = 2 and n = 3 as impurities: 15%) | 13.0 | | | | 19.5 | | | |
| | Urethane-based monomer: UK OLIGOMER UA-32P, manufactured by Shin-Nakamura Chemical Co., Ltd., non-volatile component: 75%, 1-methoxy-2-propyl acetate: 25% | | | | | | | 9.0 | 13.5 |
| | Tricyclodecanediol dimethanol diacrylate (A-DCP, manufactured by Shin-Nakamura Chemical Co., Ltd.) | | 6.5 | 6.5 | 6.5 | 6.5 | 6.5 | 6.5 | 8.5 |
| Binder | 1-Methoxy-2-propanol of (a glycidyl methacrylate adduct (d) of cyclohexyl methacrylate (a), methyl methacrylate (b), and a methacrylic acid copolymer (c) (composition (% by mass): a/b/c/d = 46/1/10/43, weight-average molecular weight: 36,000, acid value: 66 mgKOH/g, methyl ethyl ketone solution (solid content: 45%) | 89.4 | 93.6 | 112.2 | 152.2 | 89.7 | 81.2 | 97.8 | 116.3 |
| | 1-Methoxy-2-propanol of a copolymer of benzyl methacrylate (a) and methacrylic acid (b) (composition (% by mass): a/b = 70/30, weight-average molecular weight: 5,000, acid value: 112 mgKOH/g), methyl ethyl ketone solution (solid content: 45%) | | | | | | | | |
| | 1-Methoxy-2-propanol of a copolymer of allyl methacrylate (a) and methacrylic acid (b) (composition (% by mass): a/b = 80/20, weight-average molecular weight: 30,000, acid value: 66 mgKOH/g), methyl ethyl ketone solution (solid content: 20%) | | | | | | | | |
| | 1-Methoxy-2-propanol of a copolymer of benzyl methacrylate (a), methacrylic acid (b), and hydroxyethyl methacrylate (c) (composition (% by mass); a/b/c = 60/21/19, weight-average molecular weight: 14,000, acid value: 33 mgKOH/g), methyl ethyl ketone solution (solid content: 39%) | | | | | | | | |
| Initiator | 1,2-Octane dione-[4-(phenylthio)-2-(o-benzoyloxime)] (Irgacure OXE-01, manufactured by BASF) | 9.2 | | | | | | | |
| | Ethane-1-one, 1-[9-ethyl-6-(2-methylbenzoyl)-9H-carbazole-3-yl],1-(O-acetyloxime) (Irgacure OXE-02, manufactured by BASF) | | | 3.2 | 3.2 | 3.2 | | 3.2 | 3.2 |
| | 2,4-Bis(trichloromethyl)-6-[4'-(N,N-bis(ethoxycarbonylmethyl)amino-3'-bromophenyl)]-s-triazine Y1: 2-methyl-1-[4-(methylthio)phenyl]-2-morpholino-propane-1-one (IRGACURE 907, manufactured by BASF) | | 8.2 | | | | 9.2 | | |
| | 2,4-Diethylthioxanthone ("KAYACURE DETX-S" manufactured by Nippon Kayaku Co., Ltd.) | | 5.6 | | | | | | |
| Thiol | 1,4-Bis(3-mercaptobutyryloxy)butane (KARENZMT BD1 manufactured by Showa Denko K. K.) | | | | | | | | |
| | 1,3,5-Tris(3-mercaptobutyryloxyethyl)-1,3,5-triazine-2,4,6(1H,3H,5H)-trione (KARENZMT NR1 manufactured by Showa Denko K. K.) | | | | | | | | |
| | Pentaerythritol tetrakis(3-mercaptobutyrate) (KARENZMT PE1 manufactured by Showa Denko K. K.) | | | 2.2 | 2.2 | 2.2 | | 2.2 | 2.2 |
| | Pentaerythritol tetrakis(3-mercaptopropionate) ("PEMP" manufactured by Sakai chemical Industry Co., Ltd.) | | | | | | | | |
| Polymerization inhibitor | Phenothiazine | 0.3 | 0.3 | 0.3 | 0.3 | 0.3 | 0.3 | 0.3 | 0.3 |
| | N-phenyl mercaptobenzimidazole | | | | | | | | |

TABLE 1-continued

| | | | | | | | | | |
|---|---|---|---|---|---|---|---|---|---|
| Surfactant | The following structure 1 | 0.4 | 0.4 | 0.4 | 0.4 | 0.4 | 0.4 | 0.4 | 0.4 |
| Solvent | 1-Methoxy-2-propyl acetate | 236.6 | 271.4 | 261.1 | 213.6 | 234.1 | 238.7 | 229.7 | 305.3 |
| | Methyl ethyl ketone | 321.3 | 321.3 | 321.3 | 321.3 | 321.3 | 321.3 | 321.3 | 321.3 |
| | Content of black or white pigment (wt % with respect to solid substances other than solvent, (a)) | 15.7 | 11.5 | 11.5 | 18.0 | 18.0 | 18.0 | 15.7 | 3.3 |
| Transfer film | Coated film thickness (μm, (b)) | 2.0 | 1.3 | 1.3 | 2.0 | 2.0 | 2.0 | 2.0 | 9.8 |
| | (a) × (b) | 31.3 | 15.0 | 15.0 | 36.0 | 36.0 | 36.0 | 31.3 | 32.3 |

TABLE 2

| | Coloring composition | Example 17 | Example 18 | Example 19 | Example 20 | Example 21 | Example 22 |
|---|---|---|---|---|---|---|---|
| Black or white pigment | K pigment dispersion 1 | 267.2 | 267.2 | 267.2 | 267.2 | 274.8 | 259.5 |
| | K pigment dispersion 2 | | | | | | |
| Other particles | R pigment dispersion 3 | | | | | | |
| Polymerizable compound | Dipentaerythritol (penta/hexa)acrylate (manufactured by Nippon Kayaku Co., Ltd., KAYARAD DPHA) | 2.6 | 3.9 | 2.6 | 3.9 | 3.9 | 3.9 |
| | Ethoxylated bisphenol A diacrylate (A-BPE-10, manufactured by Shin-Nakamura Chemical Co., Ltd.) | | | | | | |
| | Monomer mixture (the polymerizable compound described in Paragraph [0111] of JP2012-78528A (b2-1, n = 1: the content ratio of tripentaerythritol octaacrylate: 85%, the sum of n = 2 and n = 3 as impurities: 15%) | | | | | | |
| | Urethane-based monomer: UK OLIGOMER UA-32P, manufactured by Shin-Nakamura Chemical Co., Ltd., non-volatile component: 75%, 1-methoxy-2-propyl acetate: 25% | 7.8 | 7.8 | 7.8 | 7.8 | 7.8 | 7.8 |
| | Tricyclodecanediol dimethanol diacrylate (A-DCP, manufactured by Shin-Nakamura Chemical Co., Ltd.) | 15.6 | 14.3 | 15.6 | 14.3 | 14.3 | 14.3 |
| Binder | 1-Methoxy-2-propanol of a copolymer of benzyl methacrylate (a) and methacrylic acid (b) (composition (% by mass): a/b = 70/30, weight-average molecular weight: 5,000, acid value: 112 mgKOH/g, methyl ethyl ketone solution (solid content: 45%) | 32.0 | 24.9 | 32.0 | 24.9 | 22.4 | 27.3 |
| | 1-Methoxy-2-propanol of a copolymer of allyl methacrylate (a) and methacrylic acid (b) (composition (% by mass): a/b = 80/20, weight-average molecular weight: 30,000, acid value: 66 mgKOH/g, methyl ethyl ketone solution (solid content: 20%) | 8.0 | 24.0 | | | | |
| | 1-Methoxy-2-propanol of a copolymer of benzyl methacrylate (a), methacrylic acid (b), and hydroxyethyl methacrylate (c) (composition (% by mass): a/b/c = 60/21/19, weight-average molecular weight: 14,000, acid value: 33 mgKOH/g, methyl ethyl ketone solution (solid content: 39%) | | | 4.1 | 12.3 | 11.1 | 13.5 |
| Initiator | 1,2-Octane dione-[4-(phenylthio)-2-(o-benzoyloxime)] (Irgacure OXE-01, manufactured by BASF) | 3.2 | 3.2 | 3.2 | 3.2 | 3.2 | 3.2 |
| | Ethane-1-one, 1-[9-ethyl-6-(2-methylbenzoyl)-9H-carbazole-3-yl],1-(O-acetyloxime) (Irgacure OXE-02, manufactured by BASF) | | | | | | |
| | 2,4-Bis(trichloromethyl)-6-[4'-(N,N-bis(ethoxycarbonylmethyl)amino-3'-bromophenyl)]-s-trizaine Y1: 2-methyl-1-[4-(methylthio)phenyl]-2-morpholino-propane-1-one (IRGACURE 907, manufactured by BASF) | | | | | | |
| Thiol | 2,4-Diethylthioxanthone ("KAYACURE DETX-S" manufactured by Nippon Kayaku Co., Ltd.) | | | | | | |
| | 1,4-Bis(3-mercaptobutyryloxy)butane (KARENZMT BD1 manufactured by Showa Denko K. K.) | | | | | | |
| | 1,3,5-Tris(3-mercaptobutyryloxyethyl)-1,3,5-triazine-2,4,6(1H,3H,5H)-trione (KARENZMT NR1 manufactured by Showa Denko K. K.) | | | | | | |
| | Pentaerythritol tetrakis(3-mercaptobutyrate) (KARENZMT PE1 manufactured by Showa Denko K. K.) | | | | | | |
| | Pentaerythritol tetrakis(3-mercaptopropionate) ("PEMP" manufactured by Sakai chemical Industry Co., Ltd.) | | | | | | |
| Polymerization inhibitor | N-phenyl mercaptobenzoimidazole | | | | | | |
| | Phenothiazine | 0.3 | 0.3 | 0.3 | 0.3 | 0.3 | 0.3 |
| Surfactant | The following structure 1 | 0.4 | 0.4 | 0.4 | 0.4 | 0.4 | 0.4 |
| Solvent | 1-Methoxy-2-propyl acetate | 366.8 | 357.9 | 370.7 | 369.6 | 371.6 | 367.5 |
| | Methyl ethyl ketone | 321.3 | 321.3 | 321.3 | 321.3 | 321.3 | 321.3 |
| | Content of black or white pigment (wt % with respect to solid substances other than solvent, (a)) | 35.0 | 35.0 | 35.0 | 35.0 | 36.0 | 34.0 |
| Transfer film | Coated film thickness (μm, (b)) | 1.8 | 1.8 | 1.8 | 1.8 | 2.1 | 2.1 |
| | (a) × (b) | 63.0 | 63.0 | 63.0 | 63.0 | 75.6 | 71.4 |

Coloring composition — Comparative Example 1, Comparative Example 2, Comparative Example 3

TABLE 2-continued

| | | | | |
|---|---|---|---|---|
| Black or white pigment | K pigment dispersion 1 | 72.5 | 72.5 | 343.5 |
| | K pigment dispersion 2 | | | |
| | R pigment dispersion 3 | 19.5 | 19.5 | 19.5 |
| Other particles | | | | |
| Polymerizable compound | Dipentaerythritol (penta/hexa)acrylate (manufactured by Nippon Kayaku Co., Ltd., KAYARAD DPHA) | | | |
| | Ethoxylated bisphenol A diacrylate (A-BPE-10, manufactured by Shin-Nakamura Chemical Co., Ltd.) | | | |
| | Monomer mixture (the polymerizable compound described in Paragraph [0111] of JP2012-78528A (b2-1, n = 1: the content ratio of tripentaerythritol octaacrylate: 85%, the sum of n = 2 and n = 3 as impurities: 15%) | | | |
| | Urethane-based monomer: UK OLIGOMER UA-32P, manufactured by Shin-Nakamura Chemical Co., Ltd., non-volatile component: 75%, 1-methoxy-2-propyl acetate: 25% | | | |
| | Tricyclodecanediol dimethanol diacrylate (A-DCP, manufactured by Shin-Nakamura Chemical Co., Ltd.) | | | |
| Binder | 1-Methoxy-2-propanol of (a glycidyl methacrylate adduct (d) of cyclohexyl methacrylate (a), methyl methacrylate (b), and a methacrylic acid copolymer (c) (composition (% by mass): a/b/c/d = 46/1/10/43, weight-average molecular weight: 36,000, acid value: 66 mgKOH/g), methyl ethyl ketone solution (solid content: 45%) | 6.5 113.0 | 6.5 119.2 | 6.5 |
| | 1-Methoxy-2-propanol of a copolymer of benzyl methacrylate (a) and methacrylic acid (b) (composition (% by mass): a/b = 70/30, weight-average molecular weight: 5,000, acid value: 112 mgKOH/g), methyl ethyl ketone solution (solid content: 45%) | | | |
| | 1-Methoxy-2-propanol of a copolymer of allyl methacrylate (a) and methacrylic acid (b) (composition (% by mass): a/b = 80/20, weight-average molecular weight: 30,000, acid value: 66 mgKOH/g), methyl ethyl ketone solution (solid content: 20%) | | | 0.8 |
| | 1-Methoxy-2-propanol of a copolymer of benzyl methacrylate (a), methacrylic acid (b), and hydroxyethyl methacrylate (c) (composition (% by mass): a/b/c = 60/21/19, weight-average molecular weight: 14,000, acid value: 33 mgKOH/g), methyl ethyl ketone solution (solid content: 39%) | | | |
| Initiator | 1,2-Octane dione-[4-(phenylthio)-2-(o-benzoyloxime)] (Irgacure OXE-01, manufactured by BASF) | | 3.2 | 3.2 |
| | Ethane-1-one, 1-[9-ethyl-6-(2-methylbenzoyl)-9H-carbazole-3-yl],1-(O-acetyloxime) (Irgacure OXE-02, manufactured by BASF) | | | |
| | 2,4-Bis(trichloromethyl)-6-[4'-(N,N-bis(ethoxycarbonylmethyl)amino-3'-bromophenyl]-s-triazine Y1: 2-methyl-1-[4-(methylthio)phenyl]-2-morpholino-propane-1-one (IRGACURE 907, manufactured by BASF) | 4.5 | | |
| | 2,4-Diethylthioxanthone ("KAYACURE DETX-S" manufactured by Nippon Kayaku Co., Ltd.) | | | |
| Thiol | 1,4-Bis(3-mercaptobutyryloxy)butane (KARENZMT BD1 manufactured by Showa Denko K. K.) | 3.7 | 2.2 | |
| | 1,3,5-Tris(3-mercaptobutyryloxyethyl)-1,3,5-triazine-2,4,6(1H,3H,5H)-trione (KARENZMT NR1 manufactured by Showa Denko K. K.) | | | |
| | Pentaerythritol tetrakis(3-mercaptobutyrate) (KARENZMT PE1 manufactured by Showa Denko K. K.) | | | |
| | Pentaerythritol tetrakis(3-mercaptopropionate) ("PEMP" manufactured by Sakai chemical Industry Co., Ltd.) | | | |
| Polymerization inhibitor | N-phenyl mercaptobenzoimidazole | | | |
| | Phenothiazine | 0.3 | 0.3 | 0.3 |
| Surfactant | The following structure 1 | 0.4 | 0.4 | 0.4 |
| Solvent | 1-Methoxy-2-propyl acetate | 272.9 | 269.5 | 119.5 |
| | Methyl ethyl ketone | 321.3 | 321.3 | 321.3 |
| | Content of black or white pigment (wt % with respect to solid substances other than solvent, (a)) | 9.5 | 9.5 | 45.0 |
| Transfer film | Coated film thickness (μm, (b)) | 1.0 | 1.0 | 2.0 |
| | (a) × (b) | 9.5 | 9.5 | 90.0 |

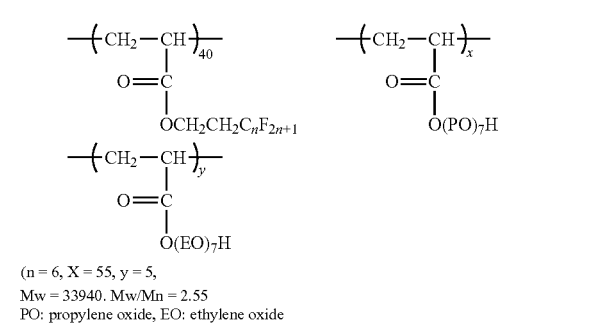

Structure 1

(n = 6, X = 55, y = 5,
Mw = 33940. Mw/Mn = 2.55
PO: propylene oxide, EO: ethylene oxide facturing of the film sensor and the cover glass-integrated sensor of Example 1, the transfer film of Example 1 was changed to the transfer films of the respective examples. The obtained results are shown in Table 5.

Meanwhile, exposure for the evaluation of the sensitivity of the transfer films of Examples 23 and 24 was carried out as described below. The other processes were carried out according to the evaluation methods of Example 1. This sensitivity evaluation can be replaced by evaluation in which laser exposure is carried out.

Using a proximity-type stepper having an ultrahigh-pressure mercury lamp (manufactured by Hitachi High-Tech Fielding Corporation), an optical filter (bandpass filter for mercury exposure HB0405, manufactured by Asahi Spectra Co., Ltd.) was installed as an exposure mask above the transfer film, furthermore, the distance of the transfer film from the temporary support was set to become 125 μm, and exposure was carried out through the temporary support at an exposure amount of 100 mJ/cm$^2$ (h rays).

TABLE 3

| Constitution | Transfer film Front plate | Example 1 Glass | Example 2 Glass | Example 3 Glass | Example 4 Glass | Example 5 Glass | Example 6 Glass | Example 7 Glass | Example 8 Glass | Example 9 Glass | Example 10 Glass |
|---|---|---|---|---|---|---|---|---|---|---|---|
| Evaluation of transfer film | Optical density | A | B | A | A | A | A | A | B | B | C |
| | Sensitivity | C | A | A | A | A | C | C | B | C | C |
| | Surface resistance | A | A | A | A | A | A | A | A | A | A |
| Evaluation of front plate-integrated sensor | Transferring property | B | A | B | B | B | B | B | A | A | B |
| | Edge roughness | A | A | C | B | B | A | A | A | B | A |

| Constitution | Transfer film Front plate | Example 11 Glass | Example 12 Glass | Example 13 Glass | Example 14 Glass | Example 15 PET | Example 16 Glass | Example 17 Glass | Example 18 Glass | Example 19 Glass | Example 20 Glass |
|---|---|---|---|---|---|---|---|---|---|---|---|
| Evaluation of transfer film | Optical density | C | A | A | A | B | A | A | A | A | A |
| | Sensitivity | A | A | C | C | B | A | C | C | C | C |
| | Surface resistance | A | C | A | A | A | A | A | A | A | A |
| Evaluation of front plate-integrated sensor | Transferring property | B | B | B | B | A | B | B | B | B | B |
| | Edge roughness | A | A | B | B | A | A | A | A | A | A |

| | Transfer film Front plate | Example 21 Glass | Example 22 Glass | Comparative Example 1 Glass | Comparative Example 2 Glass | Comparative Example 3 Glass |
|---|---|---|---|---|---|---|
| Evaluation of transfer film | Optical density | A | A | E | E | A |
| | Sensitivity | C | C | C | A | E |
| | Surface resistance | A | A | A | A | A |
| Evaluation of front plate-integrated sensor | Transferring property | B | B | B | B | B |
| | Edge roughness | A | A | E | A | E |

Examples 23 and 24

Transfer films of individual examples were produced and evaluated in the same manner as in Example 1 except for, in the manufacturing of the transfer film of Example 1, coloring compositions having a composition shown in Table 4 were used instead of the coloring composition for forming a coloring composition layer, and the film thickness of the coloring composition layer was changed to film thicknesses shown in Table 4.

After that, film sensors and cover glass-integrated sensors of the respective examples were produced and evaluated in the same manner as in Example 1 except for, in the manu-

| Coloring composition | | Example 23 | Example 24 |
|---|---|---|---|
| Black or white pigment | K pigment dispersion 1 | 261 | 261 |
| Polymerizable compound | 1,9-Nonanediol diacrylate (A-NOD-N, manufactured by Shin-Nakamura Chemical Co., Ltd.) | 4.95 | 4.95 |
| | Tricyclodecane dimethanol | 14.86 | 14.86 |

-continued

| Coloring composition | | Example 23 | Example 24 |
|---|---|---|---|
| | diacrylate (A-DCP, manufactured by Shin-Nakamura Chemical Co., Ltd.) | | |
| | 15-Functional urethane (meth)acrylate (8UX-015A, manufactured by Taisei Fine Chemical Co., Ltd.) | 9.91 | 9.91 |
| | Dipentaerythritol hexaacrylate (A-DPH, manufactured by Shin-Nakamura Chemical Co., Ltd.) | 3.30 | 3.30 |
| Binder | 1-Methoxy-2-propanol solution of a copolymer of benzyl methacrylate (a) and methacrylic acid (b) (composition (% by mass): a/b = 70/30, weight-average molecular weight: 12,000, acid value: 112 mgKOH/g) (solid content: 40%) | 194.3 | 194.3 |
| Polymerization initiator | Initiator A having the following structure | 10.46 | 10.46 |
| Sensitizer | Sensitizing dye B having the following structure | 10.46 | |
| | NBCA (the following structure) | | 10.46 |
| Solvent | Propylene glycol monomethyl ether acetate | 107.3 | 107.3 |
| | Methyl ethyl ketone | 383.1 | 383.1 |
| Surfactant | F-784-F (trade name, manufactured by DIC Corporation) | 0.35 | 0.35 |
| Content of black or white pigment (wt % with respect to solid substances other than solvent, (a)) | | 19.00 | 19.00 |
| Coated film thickness (μm, (b)) | | 2.40 | 3.00 |
| (a) × (b) | | 45.60 | 57.00 |

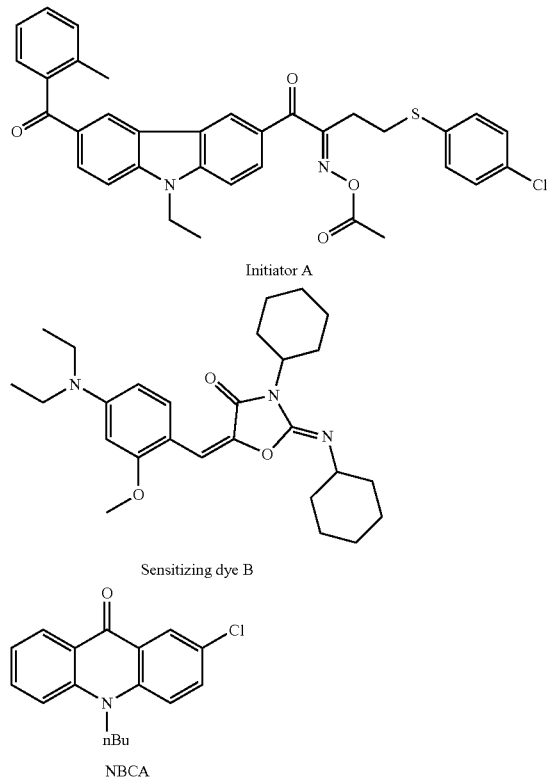

Initiator A

Sensitizing dye B

NBCA

TABLE 5

| | Transfer film | Example 23 | Example 24 |
|---|---|---|---|
| Constitution | Front plate | Glass | Glass |

TABLE 5-continued

| | Transfer film | Example 23 | Example 24 |
|---|---|---|---|
| Evaluation of transfer film | Optical density | A | A |
| | Sensitivity | A | A |
| | Surface resistance | A | A |
| Evaluation of front plate-integrated sensor | Transferring property | B | B |
| | Edge roughness | B | B |

The transfer films of the respective examples were transfer films for forming a decorative layer on at least one surface of a film sensor and were transfer films in which the optical density of the coloring composition layer was high and the sensitivity in the exposure step of the coloring composition layer was high.

In addition, the front plate-integrated sensors of Examples 1 to 11 and 13 to 24 were front plate-integrated sensors which, in a case in which the display screen of an image display device was seen through the transparent front plate which was a cover glass when the front plate-integrated sensor constituted the image display device, the outline of the display screen was sharp, the visibility was excellent, and the sense of appearance unity could be felt in the portion surrounding the display screen. The front plate-integrated sensor of Example 12 is a front plate-integrated sensor in which the outline of the display screen seen through the transparent front plate which was a PET film was sharp, the visibility was excellent, and the sense of appearance unity could be felt in the portion surrounding the display screen.

Meanwhile, in the transfer films of Comparative Examples 1 and 2 in which the value of Expression 1 was smaller than the lower limit value, the optical density was low. In addition, the front plate-integrated sensors of Comparative Examples 1 and 2, the edges of the display portions were seen through, and the sense of appearance unity could not be obtained.

The optical film of Comparative Example 3 in which the method in which a color resist material having a high concentration of a black pigment or a white pigment was used as the coloring composition for forming the decorative layer in the film sensor (the method described in JP2012-133597A) was studied failed to satisfy the upper limit value of Expression 1 and had a poor sensitivity. In addition, in the film sensor and the front plate-integrated sensor of Comparative Example 3, the coloring composition layer could not be sufficiently cured by polymerization by light, and the development step was not provided, which deteriorated the edge roughness, and thus the edge of the display portion was dirty and had a poor appearance. In addition, the baking temperature was low, and curing was not sufficient, and thus the decorative layer was easily scratched, and the yield significantly deteriorated.

[Production of Image Display Device (Touch Panel)]

To a liquid crystal display element manufactured using the method described in JP2009-47936A, the previously-manufactured front plate-integrated sensor of each example was attached, thereby producing an image display device of each example including the front plate-integrated sensor of each example as a constituent element, which is an electro-static capacitance-type input device, using a well-known method.

The image display device of each example had a sharp outline of a display screen that was visible through the front plate, was excellent in terms of visibility, and had a sense of appearance unity in a portion surrounding the display screen.

The entire content of each of the disclosures by JP2015-210249, filed on Oct. 26, 2015, JP2016-111468, filed on Jun. 3, 2016, and JP2016-140527, filed on Jul. 15, 2016 is incorporated into the present specification by reference.

All of the documents, the patent applications, and the technical standards described in the present specification are incorporated into the present specification by reference to the same extent as each of the documents, the patent applications, and the technical standards described is specifically and individually incorporated into the present specification by reference.

What is claimed is:

1. A method for manufacturing a decorated film sensor comprising:

forming a decorative layer by transferring a coloring composition layer from a transfer film to at least one surface of a film sensor including a transparent base sheet, an electrode pattern disposed on at least one surface of the base sheet, a guidance wire connected to the electrode pattern, and an overcoat layer laminated so as to cover the electrode pattern, the transfer film comprising:

a temporary support; and the coloring composition layer, which has a thickness of 0.5 μm to 10 μm and includes a black pigment or a white pigment, a polymerizable compound, a polymerization initiator, and a binder, wherein a content a (% by mass) of the black pigment or the white pigment in the coloring composition layer and a film thickness b (μm) of the coloring composition layer satisfy Expression 1, $80 > a \times b > 10$ . . . Expression 1.

2. The method for manufacturing a decorated film sensor according to claim 1, further comprising:

thermally treating the decorated film sensor at 130° C. to 170° C. after forming the decorative layer by transferring the coloring composition layer.

3. The method for manufacturing a decorated film sensor according to claim 1, wherein the at least one surface of the film sensor to which the coloring composition layer is transferred includes at least a part of the guidance wire and at least a part of the overcoat layer.

4. The method according to claim 1, wherein a ratio of the content of the polymerizable compound to the content of the binder in the coloring composition layer is from 0.1 to 2.

5. A front plate-integrated sensor comprising:

a transparent front plate; and a decorated film sensor, the decorated film sensor comprising: a film sensor; and a first decorative layer that is formed by transferring a coloring composition layer onto at least one surface of the film sensor, the film sensor comprising:

a transparent base sheet an electrode pattern disposed on at least one surface of the base sheet a guidance wire connected to the electrode pattern; and an overcoat layer laminated so as to cover the electrode pattern, the coloring composition layer having a thickness of from 0.5 μm to 10 μm and including a black pigment or a white pigment, a polymerizable compound, a polymerization initiator, and a binder, wherein an adhesive material layer is disposed between the transparent front plate and the first decorative layer, and wherein a content a (% by mass) of the black pigment or the white pigment in the coloring composition layer and a film thickness b (μm) of the coloring composition layer satisfy Expression 1:

$80 > a \times b > 10$ Expression 1.

6. The front plate-integrated sensor according to claim 5 further comprising:

a second decorative layer on a part of one surface of the front plate, wherein the second decorative layer is disposed between the front plate and the first decorative layer, and the second decorative layer superimposes at least a part of the first decorative layer of the film sensor.

7. The front plate-integrated sensor according to claim 5, wherein the front plate is glass.

8. The front plate-integrated sensor according to claim 5, wherein the black pigment includes carbon black, and the white pigment includes titanium oxide particles.

9. The front plate-integrated sensor according to claim 5, wherein the carbon black includes carbon black having a surface coated with a resin.

10. The front plate-integrated sensor according to claim 5, wherein the coloring composition layer contains a thiol compound.

11. The front plate-integrated sensor according to claim 5, wherein the binder is a binder which has a carboxyl group and an acid value of 50 mgKOH/g or more.

12. The front plate-integrated sensor according to claim 5, wherein the polymerizable compound is a compound having at least five ethylenic unsaturated groups.

13. The front plate-integrated sensor according to claim 5, wherein a content of a compound including a halogen in the coloring composition layer is 1% by mass or less.

14. The front plate-integrated sensor according to claim 5, wherein a ratio of the content of the polymerizable compound to the content of the binder in the coloring composition layer is from 0.1 to 2.

15. An image display device comprising:

the front plate-integrated sensor according to claim 5.

* * * * *